(12) United States Patent
Lamb et al.

(10) Patent No.: US 11,368,443 B2
(45) Date of Patent: Jun. 21, 2022

(54) DECENTRALIZED DIGITAL COMMUNICATION PLATFORM SYSTEM AND METHOD

(71) Applicant: CLOUD PEOPLE LLC, Lee's Summit, MO (US)

(72) Inventors: Claudia E. Lamb, Lee's Summit, MO (US); Andrew J. F. Lamb, Lee's Summit, MO (US); Michael T. Miller, Overland Park, KS (US); Alexander Savenok, Grandview, MO (US)

(73) Assignee: Cloud People LLC, Lee's Summit, MO (US)

( * ) Notice: Subject to any disclaimer, the term of this patent is extended or adjusted under 35 U.S.C. 154(b) by 0 days.

(21) Appl. No.: 17/050,979

(22) PCT Filed: May 2, 2019

(86) PCT No.: PCT/US2019/030364
§ 371 (c)(1),
(2) Date: Oct. 27, 2020

(87) PCT Pub. No.: WO2019/213372
PCT Pub. Date: Nov. 7, 2019

(65) Prior Publication Data
US 2021/0234849 A1 Jul. 29, 2021

Related U.S. Application Data

(60) Provisional application No. 62/666,087, filed on May 2, 2018.

(30) Foreign Application Priority Data

Oct. 31, 2018 (GB) .................................. 6047316
Oct. 31, 2018 (GB) .................................. 6047317

(Continued)

(51) Int. Cl.
*H04L 29/06* (2006.01)
*H04L 9/40* (2022.01)
(Continued)

(52) U.S. Cl.
CPC .......... *H04L 63/08* (2013.01); *G06Q 20/382* (2013.01); *G06Q 30/0222* (2013.01);
(Continued)

(58) Field of Classification Search
CPC ... H04L 63/08; H04L 67/306; H04L 67/1087; H04L 63/102; H04L 63/04;
(Continued)

(56) References Cited

U.S. PATENT DOCUMENTS

2003/0231211 A1 12/2003 Shah et al.
2004/0164956 A1 8/2004 Yamaguchi et al.
(Continued)

*Primary Examiner* — Kim T Nguyen
(74) *Attorney, Agent, or Firm* — Christopher J. Scott

(57) ABSTRACT

A system and method for a user-centric decentralized digital communication platform aggregating multiple user groups within a defined organization, community or affiliated networks enables secure data transfer of complex multi-party data across multiple information systems, organizations, communities, and external affiliates. A comprehensive digital ecosystem, in which varied user groups within specific industries can identify, interact and manage everyday tasks and requests, provides an intuitive networking communication platform that can utilize distributed ledger technology to reward participation and exchange. The computer-implementable communication platform system is operable in combination with multiple information systems, and includes or provides a central remote abstraction layer, service or system for enabling inter-information system operations, and a single interface for client-to-information system interactions. The remote abstraction layer, service or system communicates with administrative clients associated with the multiple information systems and authenticated (Continued)

client devices for identifying and approving data release from select information systems.

21 Claims, 20 Drawing Sheets

(30) Foreign Application Priority Data

| Oct. 31, 2018 | (GB) | 6047318 |
|---|---|---|
| Oct. 31, 2018 | (GB) | 6047319 |
| Oct. 31, 2018 | (GB) | 6047320 |
| Oct. 31, 2018 | (GB) | 6047321 |
| Oct. 31, 2018 | (GB) | 6047322 |
| Oct. 31, 2018 | (GB) | 6047323 |
| Oct. 31, 2018 | (GB) | 6047324 |

(51) Int. Cl.
*H04L 67/306* (2022.01)
*H04L 67/1087* (2022.01)
*G06Q 20/38* (2012.01)
*G06Q 30/02* (2012.01)

(52) U.S. Cl.
CPC ............ *H04L 63/04* (2013.01); *H04L 63/102* (2013.01); *H04L 67/1087* (2013.01); *H04L 67/306* (2013.01); *H04L 2463/082* (2013.01)

(58) Field of Classification Search
CPC . H04L 2463/082; H04L 67/36; G06Q 20/382; G06Q 30/0222
See application file for complete search history.

(56) References Cited

U.S. PATENT DOCUMENTS

| 2006/0067486 | A1 | 3/2006 | Zellner et al. |
| 2006/0083357 | A1 | 4/2006 | Howell et al. |
| 2008/0014931 | A1* | 1/2008 | Yared ................ H04L 29/12122 455/432.3 |
| 2011/0173539 | A1 | 7/2011 | Rottler et al. |
| 2013/0019182 | A1 | 1/2013 | Gil et al. |
| 2013/0311946 | A1 | 11/2013 | Kwon |
| 2014/0259190 | A1* | 9/2014 | Kiang ................ G06F 21/6218 726/30 |
| 2016/0057626 | A1 | 2/2016 | O'Toole et al. |

* cited by examiner

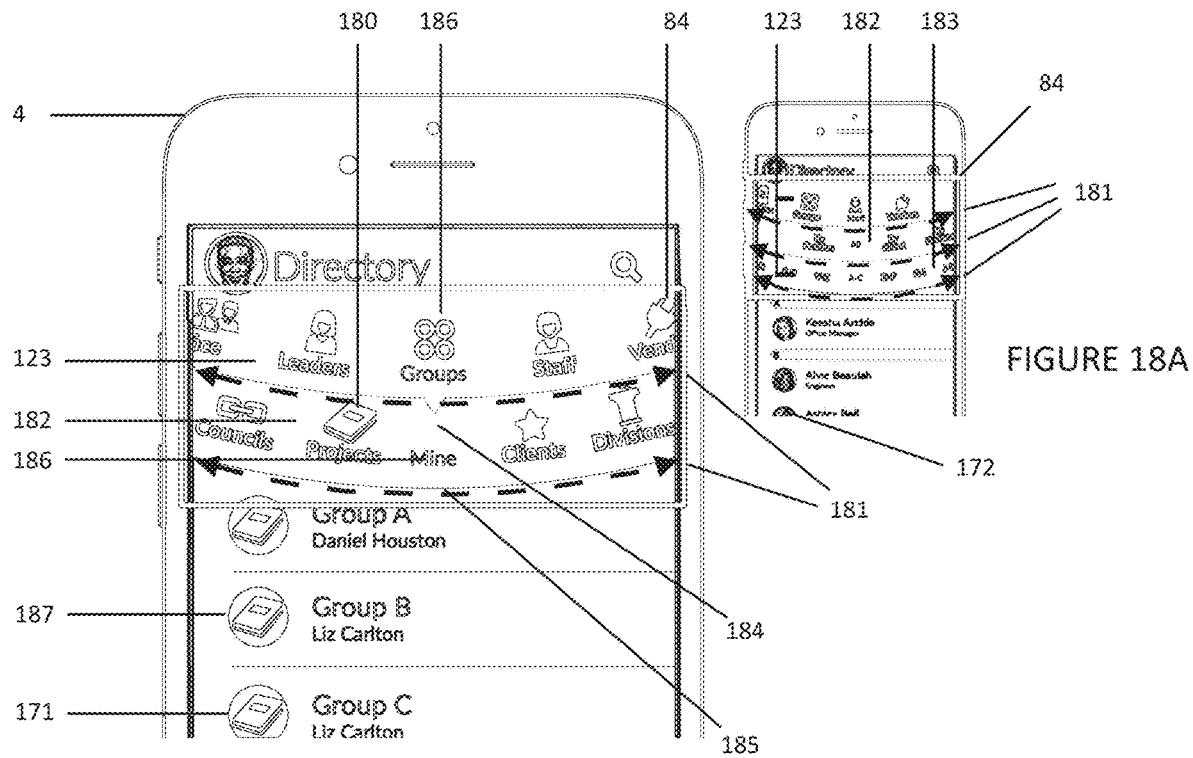
FIGURE 18
FIGURE 18A
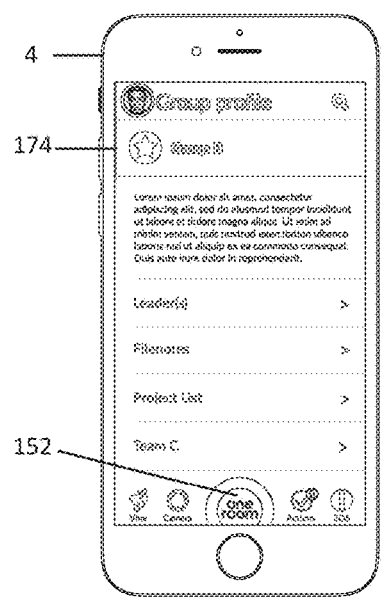
FIGURE 19

DECENTRALIZED DIGITAL COMMUNICATION PLATFORM SYSTEM AND METHOD

PRIOR HISTORY

This application is a US national stage entry application from International Patent Application No. PCT/US2019/030364 filed in the United States Patent and Trademark Office (USPTO) as International Receiving Office on 2 May 2019, which International Patent Application claims priority from U.S. Provisional Patent Application No. 62/666,087 filed in the USPTO on 2 May 2018; pending U.S. Design patent application Ser. No. 29/668,381 filed in the USPTO on 30 Oct. 2018; and registered UK Industrial Design Application Nos. 6047316, 6047317, 6047318, 6047319, 6047320, 6047321, 6047322, 6047323, and 6047324 filed in the UK Intellectual Property Office on 31 Oct. 2018.

FIELD OF THE INVENTION

The present invention relates generally to a system and associated methodology for a flexible multi-tenancy user-centric decentralized digital communication platform for a definable organization or community, and more particularly relates to a system and associated methodology for enabling secure data transfer of complex multi-party data across multiple information systems, organizations and/or communities, and external affiliates.

BRIEF DESCRIPTION OF THE PRIOR ART

Organizations and communities are a complex network of interdependent groups designed to be inextricably focused and organized around a common goal. Effective communication is a key driver to organizational success. Poor communication has a defining and significant impact within organizations, among its stakeholders and even external affiliates that results in disengagement and impacts an organization's ability to accomplish its goals and increase profitability or sustainability.

Market sectors, ranging from education to health care to business, are rife with problems relating to communication, record keeping, payment transactions, permissions and information dissemination between user groups. To aid with communication, organizations implement a variety of tools, both digital and non-digital to overcome these difficulties. However, many of these systems lack a multi-layered user-centric approach and do not take into account the dynamic roles and needs of disparate stakeholders, their workflow process and how they engage and interact in and around an organization.

Current organizational communication problems derive from legacy systems, outdated portals, partial solutions incapable of integration and siloed solutions with different user interfaces and experiences. Furthermore, most systems are built for administrators according to the tasks they need to execute. This creates further communication silos between administrators and multi-party end-users who often operate and move between a variety of systems implemented within and outside of an organization. The lack of a coordinated multi-party user-centric communication infrastructure causes inefficiency and a lack of information and engagement across both internal and external stakeholders. The collaborative requirement of an organization is stymied due to a lack of effective task management and execution, disorganized connections and undiscovered natural social connections.

With the advent of computer and mobile technology, and the subsequent challenges of unregulated social networks, the prior art perceives a need for a decentralized yet unique and unified platform that enables data ownership, collaborative interaction, multi-party user-centric communication and task execution among all user groups within an organizational ecosystem. End users of the present invention may thus be relieved of unnecessary friction and the time-consuming cost of executing tasks and identifying the location and evaluating the importance of information; administrators and content creators are able to quickly and easily communicate information as summarized in more detail hereinafter.

SUMMARY OF THE INVENTION

Among the many objectives of this invention is the provision of a comprehensive digital ecosystem where the varied user groups within specific industries can identify, interact and manage everyday tasks and requests on an intuitive networking platform that can utilize distributed ledger technology to reward participation and exchange. The present invention is a communication hub that offers a customized, secure, self-contained and yet expandable communication platform that incorporates distributed ledger technology (where applicable) to create a comprehensive communication system for any industry, community or organization with multiple stakeholders interacting around common goals.

The present invention provides a decentralized digital communication platform for enabling administrators to effectively communicate tasks and information and users can execute on task requests and information received in accordance to their unique role within an organization, community or affiliated network. In this manner, the invention connects the variety of stakeholders who create, disseminate and consume information by building valuable, secure and stable social relationships with any stakeholder authorized to operate within the digital communication platform. The invention streamlines industry specific needs from a systems level perspective to meet the complex transactional and relational goals of an organization and the unique user, weaving them together into a common user-friendly graphical interface and integrated network.

The present invention further enables users within an organization, community group or affiliated network to own the value of their task engagement, data and content. Organizations and community groups are able to connect directly with affiliated external organizations and groups for mutual benefit both commercially and socially. The present invention provides an 'iron bubble' of security around a centrally administered community or organization within a decentralized platform structure, wherein a mecca of information, transactions, connections and resources can be transparently and securely shared.

The present invention further combines critical networking abilities with content and task management needs to enable distinct but connected user groups to communicate effectively across unlimited locations at multiple levels of access based on assigned authorities and permissions. This invention may be described as containing and connecting five primary features, including a uniquely designed common graphical multi-user interface; a robust database management system with relevant data storage facility and location-based proximity alerts/identity authentication; the inclusion of distributed ledger technology to enable data ownership and where applicable, the operation of an internal token economy; and a user-centric personally owned platform.

The communication platform system and method according to the present invention provides a secure, self-contained environment in which all authorized users can onboard and communicate with those in the organization and authorized affiliates external to an organization without the use of personal data such as email or phone number. Within the communication platform, the present invention controls access to information and users on a customizable basis by organizational administrators, thereby matching the level of access to the level of authority possessed by each user.

The present invention further permits text, photo, audio, video and data communication to an unlimited combination of pre-identified groups or individual users as determined by the organizational authority. As such, it incorporates multi-channel chat functionality and social streams contained according to user group and permissions. This invention also contains integrated record-keeping capabilities such as attendance, payment transactions, permissions, calendar events and invites, data metrics and document execution.

The present invention further provides users with an easily navigated graphical user interface customized according to the stakeholders'/users' role and through which any functions assigned to that stakeholder group can be quickly accessed. In this invention large amounts of communication are segmented into digestible information according to function. Users are connected to existing data storage mediums containing relevant information and documents through a data management system.

BRIEF DESCRIPTIONS OF THE DRAWINGS

Other features and objectives of the invention will become more evident from a consideration of the following brief descriptions of patent drawings.

FIG. 18 is an enlarged fragmentary view of an upper portion of a mobile communications device with a group type drop-down tier filtering feature of the graphical user interface according to the present invention being highlighted for consideration by the reader.

FIG. 18A is a reduced fragmentary view of an upper portion of a mobile communications device with an individual type drop-down tier filtering feature of the graphical user interface according to the present invention being highlighted for consideration by the reader.

FIG. 19 is a depiction of a mobile communications device with a group profile feature of the graphical user interface according to the present invention being highlighted for consideration by the reader.

DETAILED DESCRIPTION OF THE PREFERRED EMBODIMENT

Figure 1:
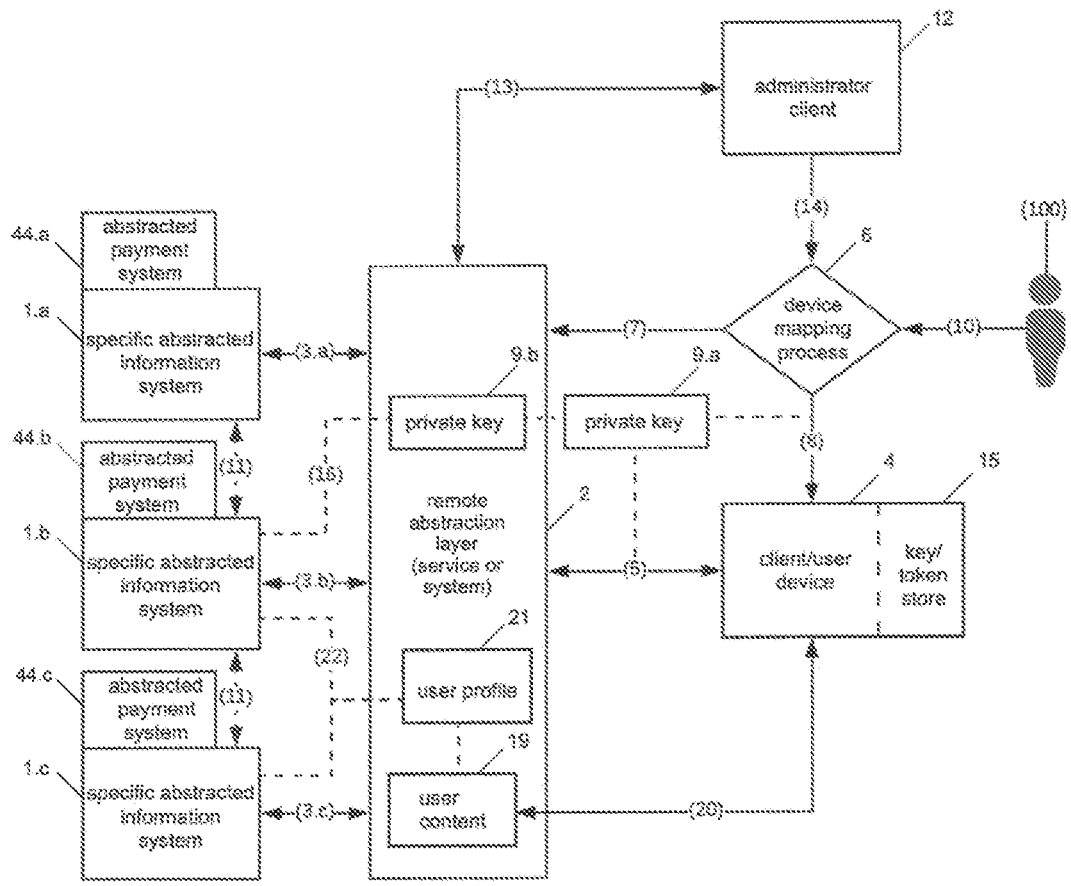
FIG. 1 is a first of six flowchart diagrams depicting primary system components that constitute the digital communication platform according to the present invention.

Referring now the drawing with more specificity, the non-transitory, computer-implementable, software-driven ONEROOM brand communication platform system or more simply ONEROOM platform according to the present invention provides a common graphical user interface most typically implementable upon at least one, but typically a plurality of mobile communications, desktop, or tablet type client devices as at 4, and is designed from a multi-stakeholder user-centric standpoint while maintaining the simplicity of interactions between various user groups. The ONEROOM platform is a decentralized communications platform in which permissions are authorized by client organization according to user role.

The ONEROOM platform preferably comprises or includes a number of primary systemic components as generally depicted in FIG. 1. The platform system is meant to operate in cooperation with multiple information systems as variously depicted and referenced at 1.*a*, 1.*b*, and 1.*c* that may be either internal information systems or external information systems and exemplified by Student Information Systems (SIS); Hospital Information Systems (HIS); and Customer Relationship Management (CRM) systems.

In other words, multiple representative information systems usable in combination with the ONEROOM platform are comparatively depicted and referenced at 1.a, 1.b, and 1.c in FIG. 1. Each information system as generally depicted and referenced at 1.a, 1.b, and 1.c is preferably affiliated with an abstracted payment system as respectively referenced at 44.a, 44.b, and 44.c. Inter-information system operations or communications are generally referenced at 11 between the information systems 1.a, 1.b, and 1.c. These inter-information system operations 11 are preferably of Create, Read, Update, and Delete or CRUD type operations or functions within a persistent storage environment.

The multiple information systems 1.a, 1.b, and 1.c interact as at 3.a, 3.b, and 3.b with a remote abstraction layer, service or system 2 according to the present invention, which remote abstraction layer, service or system 2 is central to the practice of the present invention. The ONEROOM brand remote abstraction layer, service or system 2 according to the present invention enables (a) the inter-information system CRUD operations 11, (b) a single graphical user interface or simply interface for client-to-information system CRUD interactions as at bi-directional client/abstraction layer CRUD interactions 5; and (c) interactions with the abstracted payment systems as at 44.a, 44.b, and 44.c.

At least one remote administrator client or admin client 12 according to the present invention is preferably in communication with or has access as at Internet Protocol or IP-restricted admin-to-abstraction layer interactions 13 to the remote abstraction layer, service or system 2 from a specified Internet Protocol or IP address to interact with the remote abstraction layer, service or system 2 to enable (i) user creation, (ii) user identification, and (iii) device-to-user mapping, and further to authenticate the clients or client devices 4 using the ONEROOM platform.

A client or client device typified by a mobile communications device such as a smart phone, but also embracing tablet and desktop type devices, is depicted and referenced at 4, and is preferably outfitted with specialized client device-authentication means utilizing methods characterized by the following methods. A person or user as at 100 presents as at personal identification document verification process 10 valid identification, and an administrator client or admin client 12 initiates the client devices 4 or user authentications via a device-mapping process as at 6 which device-mapping process 6 preferably includes the following steps. A temporary token is generated by the administrative client or admin client 12, and submitted to the remote abstraction layer, service or system 2 via an IP-restricted communication channel 13 and passed as at 14 to the clients or client devices 4, possibly through a QR code or wireless communication means (e.g. NFC, RFID, or Bluetooth LE).

The clients or client devices 4 uses the temporary token to access as at 7 the remote abstraction layer, service, or system 2 to generate client authentication credentials such as a secret key, public key, or a permanent public/private keypair as at 9.a and 9.b, or similar credentials, and then delivers as at generation of client authentication credentials 8 the private key 9.a to the client(s) or client device(s) 4. The temporary access token also links as at information system user record link 16 the person or user 100 and information system user record to the client(s) or client device(s) 4, validating each client or client device 4 as belonging to a specific person or user 100, and enables or authorizes the release of data or documents from a specific information system 1.a, 1.b or 1.c on behalf of the user 100.

The temporary access token is also used to generate a key specific to an information system exemplified by information system 1.b in FIG. 1, enabling each client or client device 4 to approve data release 16 from information system 1.b, and approving/signing documents proceeding from the select information system as depicted and referenced at 1.b. The client device(s) 4 preferably store the key in a secure client-sided key or token store 15 associated with the client device(s) 4, and use the private key to enable secure and authenticated communication 5 with the remote abstraction layer, service, or system 2. The users preferably authenticate in such a manner for every information system that is added to each ONEROOM communication platform system client or client device 4.

The components listed above enable a person or user 100 to use the client device(s) 4 with authentication, released after a personal identification document verification process 10 to approve both inter-information system and intra-information system data release and transfer. For example, if a first information system 1.b associated with a first school or first SIS were required to release records to a second information system associated with a second school or second SIS as at 1.a (after a parent has approved the release), a school administrator may submit an inter-information system transfer request as at 11.

The remote abstraction layer, service or system 2 receives this request as at 3.b, and notifies as at 5 the mapped client device 4 (e.g. notifications can be over socket, or push notifications, or retrieved over basic HTTP when a client device 4 is opened), whereafter the client device 4 presents to the user/person 100 a request to transfer data 11 from the first information system 1.b to the second information system 1.a. Once the user 100 approves the transfer, the data is transferred from the remote abstraction layer, service or system 2 to the second or new information system 1.a.

Figure 2:
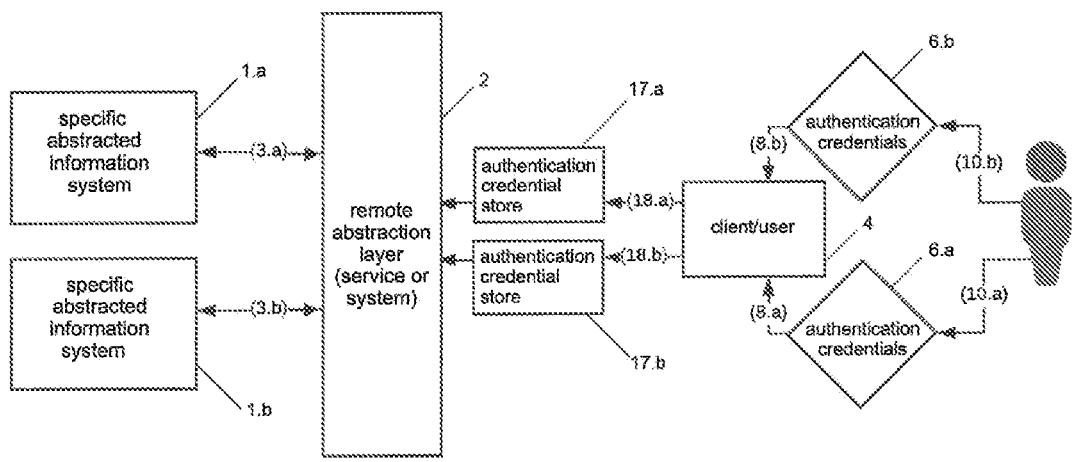
FIG. 2 is a second of six flowchart diagrams depicting primary system components that constitute the digital communication platform according to the present invention.

Referencing FIG. 2, the reader will there consider a single client device 4 that cooperates with the information systems 1.a and 1.b. One critical advantage presented by the ONEROOM platform is single client-to-multiple information system interactions. The functionality enables users 100 to generate authentication credentials as at 6.a/8.a, and 6.b/8.b by presenting valid identifications as at 10.a and 10.b to multiple information system administrators or operating admin clients 12.

The client device 4 is enabled to store authentication credentials as at 17.a and 17.b on a single client device 4 for multiple information systems 1.a and 1.b and payment systems 44.a and 44.b thereby enabling a single client device 4 to interact as at bi-directional information system/abstraction layer CRUD interactions (e.g. as at 3.a and 3.b) with verified client/service interaction verifications 18.a and 18.b without needing to re-authenticate when switching between information systems 1.a and 1.b or payment systems as at 44.a and 44.b. The interactions are enabled by the remote abstraction layer, service, or system 2 that maps information system users 100, and validates client/information system interactions, determining if client requests are being sent by users 100 with the proper information system permissions.

Referring back to FIG. 1 the reader will there consider that another key advantage of the ONEROOM communication platform system is the ability of the remote abstraction layer, service or system 2 to store user-generated content 19 as generated by client content generation means 20 by an authorized client device 4. The user-generated content 19 is preferably kept separate from legally sensitive information of the information systems 1.a, 1.b, and 1.c within the remote abstraction layer, service or system 2. The ONEROOM communication platform system allows a user profile 21, associated with the user-generated content 19 existing within the remote abstraction layer, service or system 2, to be mapped to information system user entries 22 of the information systems 1.a, 1.b, and 1.c, and thus a single user profile 21 and information system user entries 22 may be mapped to the multiple information systems 1.a, 1.b, and/or 1.c.

Blockchain Enabled Transactions

Figure 3:
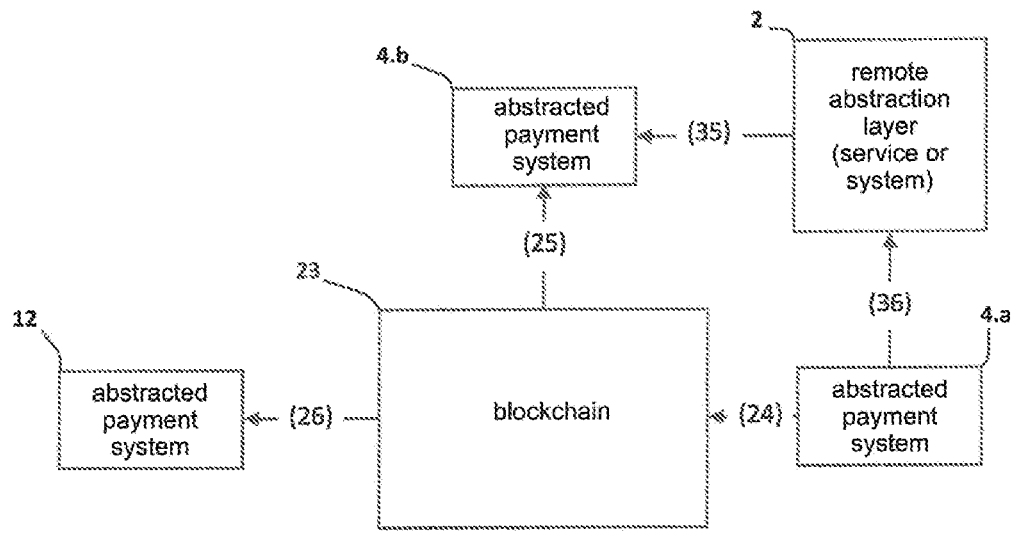
FIG. 3 is a third of six flowchart diagrams depicting primary system components that constitute the digital communication platform according to the present invention.
Figure 4:
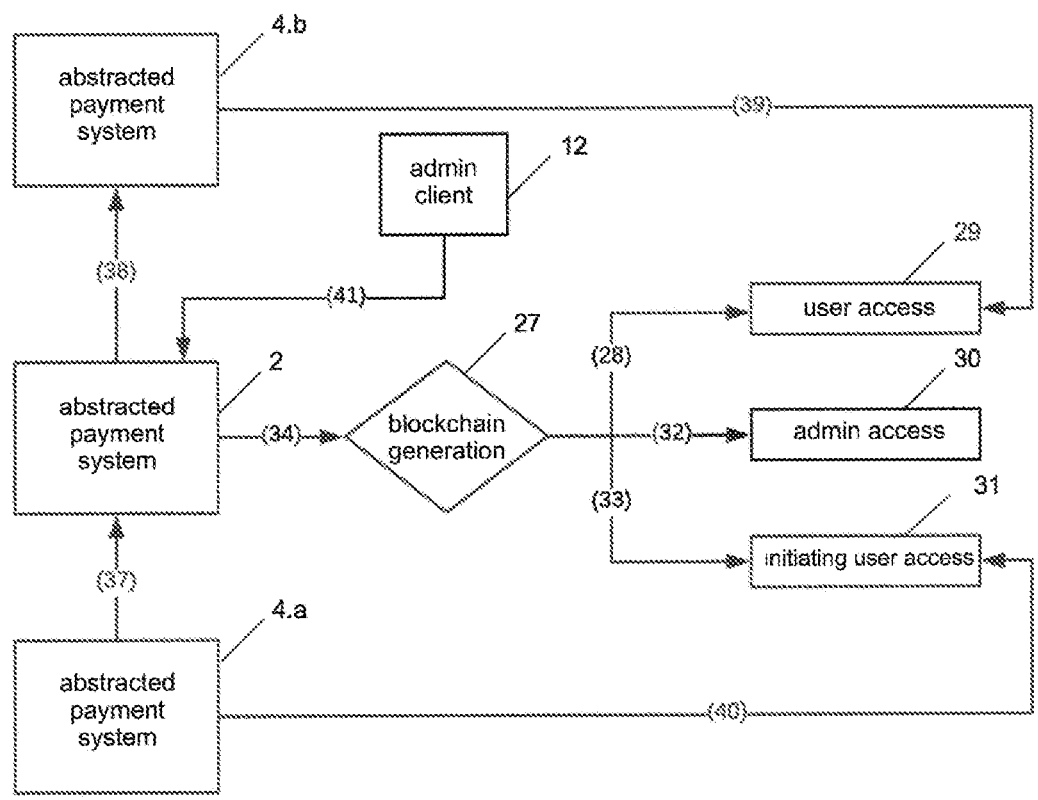
FIG. 4 is a fourth of six flowchart diagrams depicting primary system components that constitute the digital communication platform according to the present invention.

Comparatively referencing FIGS. 3 and 4, the reader will there consider blockchain-enabled transactions according to the present invention. The blockchain-distributed ledger-enabled transaction system according to the present invention preferably comprises certain additional systemic components and can be used for messaging, data and/or token transactions. A blockchain-enabled peer-to-peer datastore, enabled to store structured data including structured text messages/data/tokens/information such as records and credentials, may be sent from a first client as at 4.a to a second or another client as at 4.b. In a real estate context, for example, the stored structured data may include title deeds.

The blockchain generation process 27 promulgates rules or constraint logic that constrain the following actions: receiving user access 29 via receiving user registration constraint 28; administrative access 30 via administrative access device constraint/registration 32; and initiating user access 31 via initiating device registration constraint 33. The constraints limit administrative access (allowing the administrator to review the messages/tokens) to a designated, predefined or specified device listing as at 41 at blockchain initializations or generations 34. The receiving and initiating user constraints restrict the sending or receiving of messages/tokens between clients 4.a and 4.b by validating that the incoming requests are signed with valid tokens generated and passed as at messaging blockchain initialization request 37 and messaging blockchain initialization notification 38 at blockchain initialization or generation 34.

The remote abstraction layer, service or system 2 generates a specified blockchain as at 23 with the designated, predefined or specified device listing 41 of administrative devices 12, enabled to unlock the content of the blockchain 23. The designated, predefined or specified device listing 41 is sent to the remote abstraction layer, service or system 2 via an administrative client 12 associated with a specific or select information system 1. The remote abstraction layer, service or system 2 is enabled to act as an intermediary at blockchain initialization 34 by generating a blockchain 23 when requested as at 37 by a client device 4 according to the constraints and with the predefined or specified device listing 41 which are required by the information system 1 (e.g. 1.a, 1.b or 1.c) in which the client device 4 is operating.

The remote abstraction layer, service or system 2 is also enabled to notify the receiving client 4.b of a request to initiate a messaging/data/token blockchain. The remote abstraction layer, service or system 2 is also enabled to receive notifications of messages/data/tokens that have been sent as at message sent request 36 and push such notifications as at message received notification 35 to receiving clients 4.b. The notifications have no message data, but metadata regarding the blockchain 23 in which the data is located, and time sent, enabling the client 4.b to request data as at 25 from the blockchain 23 in a more efficient manner. Client devices 4 are thus enabled to generate tokens and send 24 messages/data/records (messages may be structured text data as in JSON/XML storing both simple text and dynamic content data like a URL) and receive 25 messages/data/records.

Blockchain initialization occurs when an initiating client device as at 4.a receives user input indicating that the user would like to initiate a conversation with or send a token or record to a user registered within the remote abstraction layer, service or system 2. The initiating client device 4.a generates a public/private key pair as at 9.a/9.b at the time, and sends the public/private key pair 9.a/9.b in an initiating request as at 37 to the remote abstraction layer, service or system 2.

Once the remote abstraction layer, service or system 2 receives the request 37, the remote abstraction layer, service or system 2 immediately generates as at blockchain initialization 34 a blockchain-enabled peer-to-peer data store or more simply blockchain 23, and releases it into a peer-to-peer network. The remote abstraction layer, service or system 2 responds to the initiating client device 4.a with the identifying information necessary to interact with the blockchain 23, within the peer-to-peer network. The remote abstraction layer, service or system 2 then pushes as at 38 a notification to the receiving client 4.b that a new blockchain 23 has been created which it can access by using the public token included in the notification 38.

Both client devices 4.a and 4.b send initiating requests as at receiving-client blockchain registration request 39 and initiating-client blockchain registration request 40 to the blockchain 23 with their respective portions of the keypair 9.a/9.b. The blockchain 23 is validated, and enabled to send and receive messages proceeding from the client devices 4.a and 4.b if the tokens provided in the initialization requests are valid.

Validation is done by standard industry means used in systems requiring key pair authentication. All messages, records or tokens proceeding from the client devices 4.a and 4.b are then signed with the token they provided at initialization, confirming that the message/record/token is being sent from a valid client device 4. Requests to retrieve or send messages that are not signed with the proper token, will be rejected. Administrative access or administrative data retrieval requests 26 to the blockchain 23 may be preferably constrained to a specific client device 4 by constraining access to a specific device Media Access Control or MAC address.

Token Mechanics Framework

Figure 5:
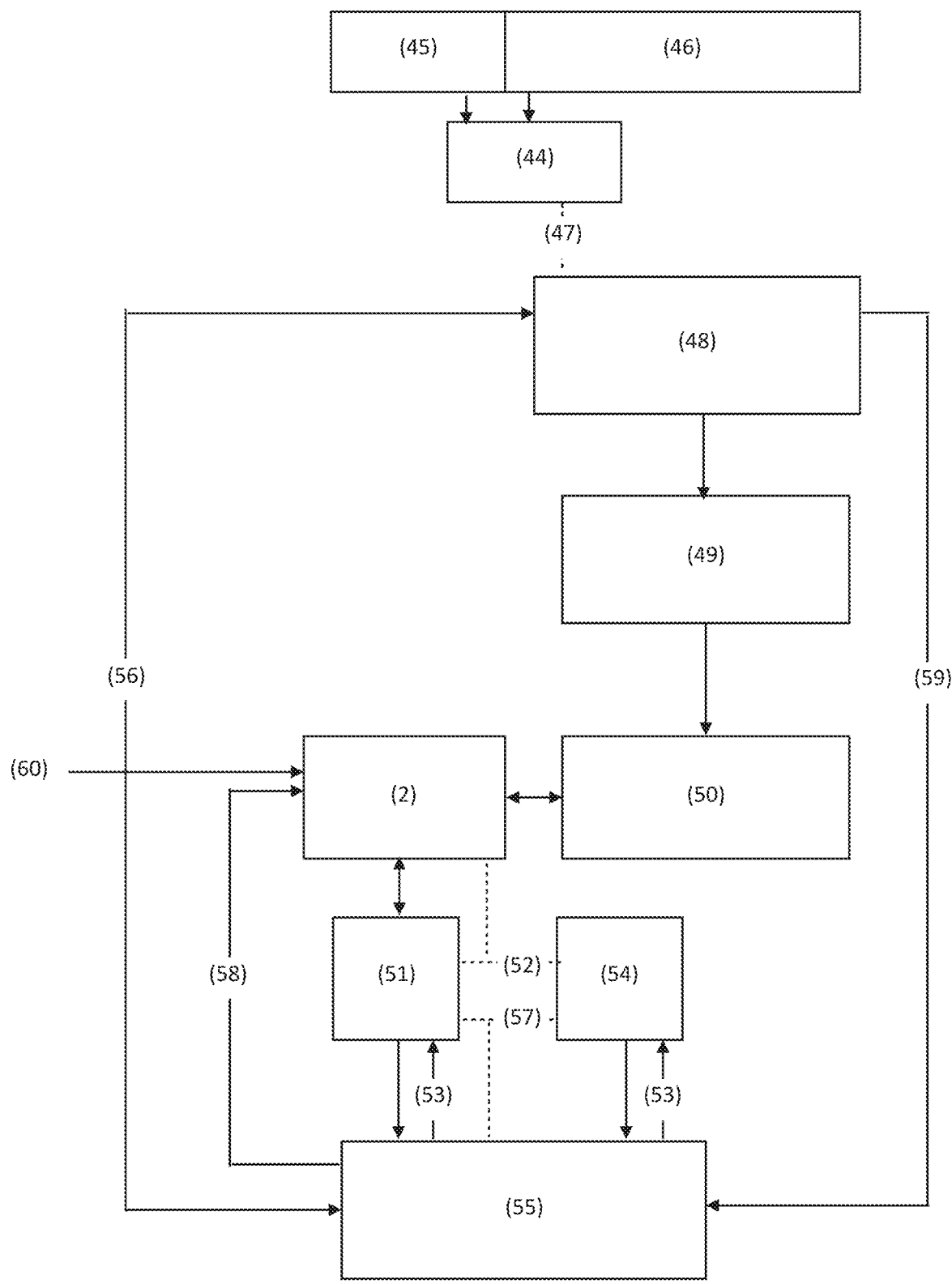
FIG. 5 is a fifth of six flowchart diagrams depicting incorporation of an internal token system according to the present invention.

Referencing FIG. 5, the ONEROOM communication platform system according to the present invention may preferably further comprise certain token mechanics, allowing an organization to create an internal economy or system of rewards. Tokens are preferably created by the organization using the ONEROOM communication platform system, via a coin offering (ICO/SCO) or in cases where the organization is a not-for-profit public benefit organization, via an external administrative organization. For instance, an educational organization may agree to implement the ONEROOM communication platform system with remote abstraction layer, service or system 2 and opt into the token mechanics system component. The tokens are preferably stablecoins, a digital cryptocurrency that is collateralized to the value of an underlying asset such as 'fiat' currency.

In the case of educational organizations, for example, an external administrative organization or donor 46 may preferably raise and administer the funds behind the tokens. The district/school is given an allocated number of tokens related to pre-determined measurements. User management, view and distribution of tokens is referenced at 51. At the start of the school year, once secondary platform users 54 have been added to the platform, every user 54 receives a base number of tokens. Users 54 have the ability to earn tokens as they move through the academic year.

Tokens can be earned through engagement with the platform, involvement in extracurricular activities, good behavior (including attitude, work habits, class content), grades and attendance. User management, view and distribution of tokens 51 can also transfer or distribute tokens as at 52 to other users as at 54 in the platform ecosystem including external organizations as at 55. The school/district and/or the external administrative organization builds partnerships with external commercial entities to enable platform users to redeem tokens for products and benefits as at toke reward partnership 59.

The primary systemic components 60 enabling the token system are generally depicted in FIG. 3-4 and are in communication with the remote abstraction layer, service or system 2. An individual donor is referenced at 45, and an organizational donor is referenced at 46. The donors 45 and 46 input token-supportive funds into an abstracted payment system as referenced at 44 with transfer of monies 47 into an external/internal administrative organization/account as at 48. Tokens are assigned as at token assignment 49 whereafter tokens may be distributed as at token distribution 50. The ONEROOM platform may preferably log and track/update user accounts 58 and issues automated invoices 56. Any unspent tokens remain in the users' wallet/payment account and may be redeemed as at 53 with external organizations as at 55 with product/service receipts referenced at 57.

User-Generated Content or UCG

Notably, the ONEROOM communication platform system has been designed to facilitate effective communication in numerous market sectors. For ease of understanding, examples generally refer to the Education sector. Within the ONEROOM communication platform system, content is created by numerous users within specific user groups or types. The User Generated Content (UGC) types vary according to user role and permissions granted within an organization. The ONEROOM communication platform system has been designed to enable numerous audience groups to interact at different levels with each user group/type. User types across market sectors vary, but are broken down according to an organization's hierarchical structure. The content that is created and functions permitted are specific to the users' specific industry.

Figure 23:
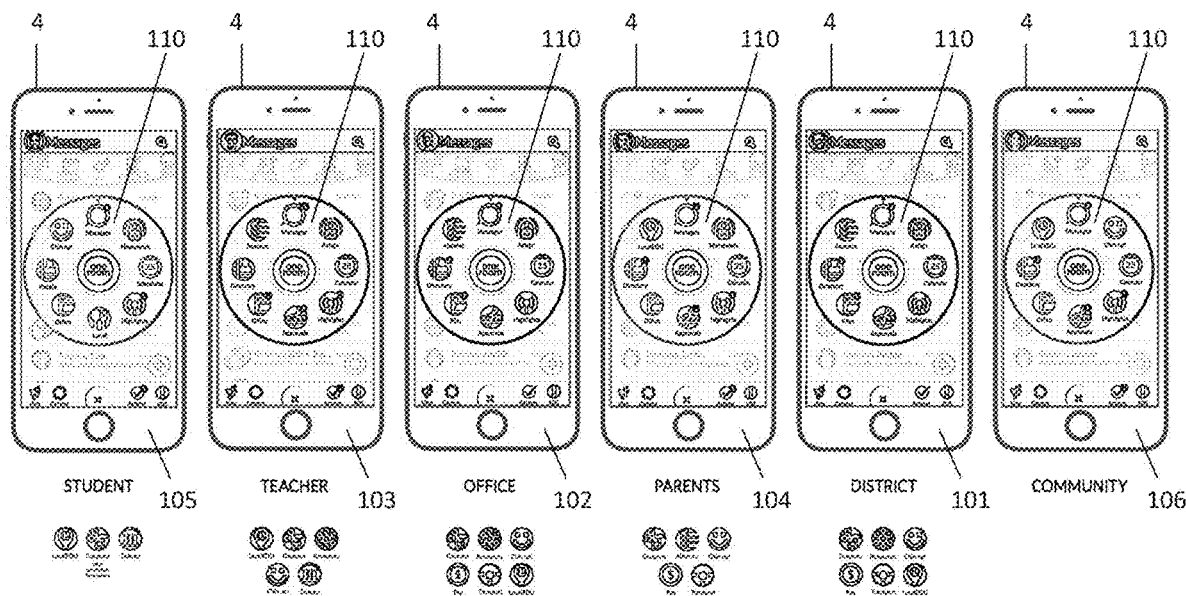
FIG. 23 is a depiction of a series of six reduced mobile communications devices each of which show an actions dialer feature of the graphical user interface for various education sector user groups.

Citing the education sector as an exemplary sector, the reader is directed to FIG. 23 depicting a series client devices 4 for various individuals within the user group, including district users as at 101; school/office/local staff as at 102; teaching staff as at 103; parents as at 104; students as at 105, and external community (i.e. social workers, local businesses or community groups such as the YMCA, Boy Scouts, church groups, etc.) as at 106. A basic premise of the ONEROOM platform is to enable organizations to operate around a single user group and goal.

In the case of education, the single user group is the student group, and the goal is the successful education of this group as may be preferably measured via high school or secondary school or higher education graduation rates. In healthcare, the single user group that an organization seeks to serve is the patient and the goal is the successful restoration to health measured via medical results and improvements in health. In small businesses, the single user group that an organization seeks to serve is the client or customer, with the goal being product sales or successful project execution measured via increased profits and repeat business.

Organizations and user groups within them are not static and may preferably be organized into sub-groups. Examples of sub-groups within educational user groups could include: classes that include students, teachers, class assistants; year groups—e.g. all grade 5 students; clubs—e.g. sports, chess, music; subject interest—e.g. all drama students, all drama teachers; sports teams—e.g. boys' football; other intersections: e.g. gender/time/place. All user-generated content and features within the platform can be broken into 6 broad categories: Communication: verbal, written, visual and audible messages tagged as 'for information' or 'for action'; Action: messages that require further steps; Read: information, documentation; Learn: information that requires further action; Go: information that requires physical action and movement; Give: information that requires payment or financial insight/transaction.

Figure 6:
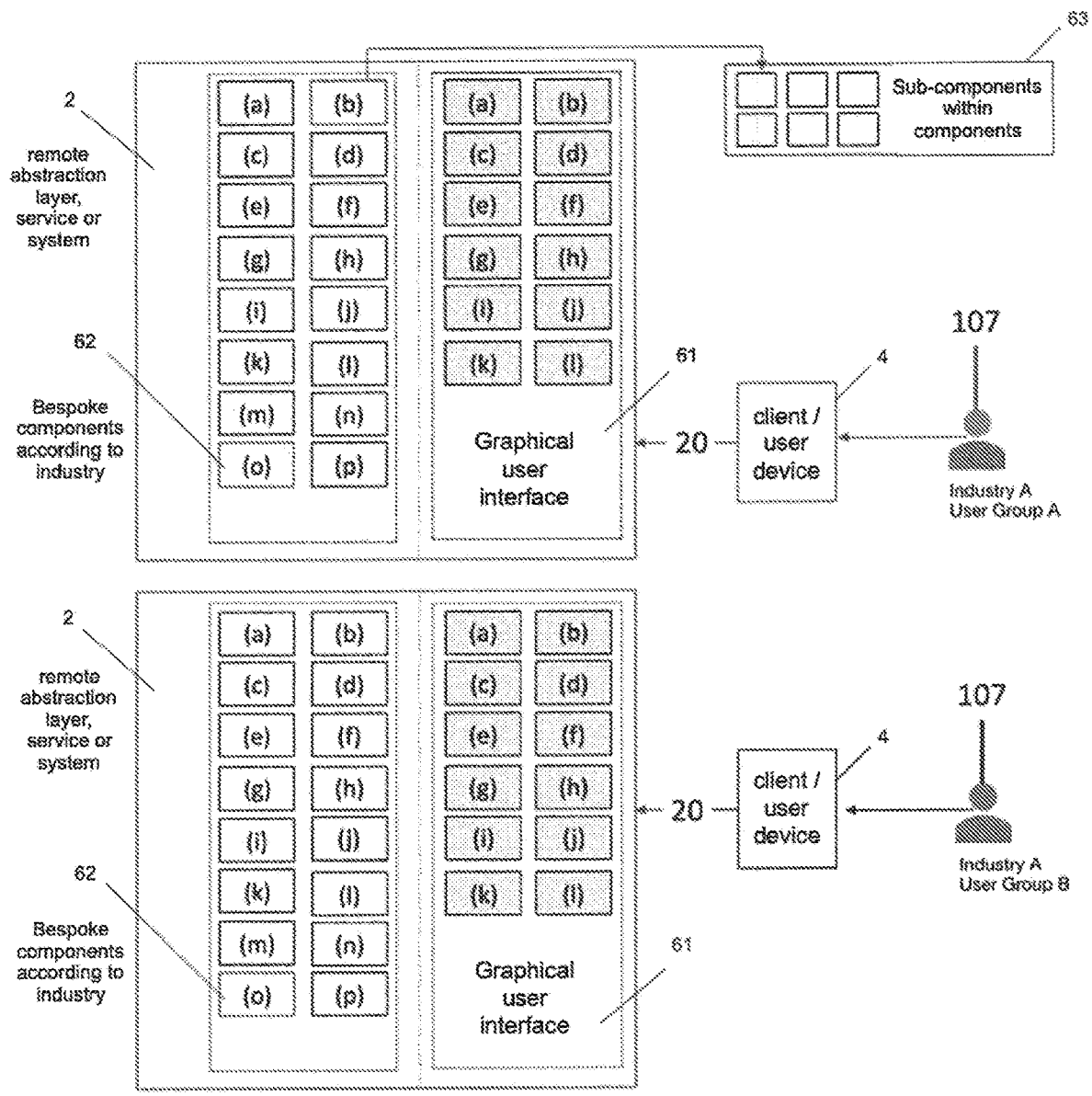
FIG. 6 is a sixth of six flowchart diagrams depicting primary system components that constitute the digital communication platform according to the present invention.

Accordingly, referencing FIG. 6, the reader will there consider another key advantage of the ONEROOM platform is the ability of the remote abstraction layer, service or system 2 to store user-generated content generated via client content generation means 20 by an authorized client device 4. The ability of the user to access and produce content is subject to their user role within an organization. Each user group as at 107 and 108 can access common graphical user interface components 61 common to all user audiences and interfaces (as at 61.*a*-1), and bespoke components (custom graphical user interface components dependent on audience and industry (62.*a-p*)) according to their role and industry sector. Within each component (61.*a*-1/62.*a-p*) exist sub-components with generated component subtasks and functionality as at 63.

Both user groups 107 and 108 are using the same ONEROOM platform, and according to their role, both user groups 107 and 108 have common components as at 61 that they access as well as differing components that they access. This is illustrated by the fact that for user group A 107 certain components are shaded to represent those to which they have access, and the corresponding functions whereas those components to which they do not have access are left unshaded. Similarly, user group B 108 has different components/features shaded and unshaded. User Group A 107 has access to all components/functions bar (j) and (n). User Group B 108 has access to all components/functions bar (e), (g) and (l).

The drawings presented in support of the Graphical User Interface according to the present invention as presented as generic representations of the design and function of the Graphical User Interface (GUI). They are applicable to each industry described in more detail below. The ONEROOM platform further enables an unlimited number of unique user groups to communicate within a select organization/community. Each user group within an organization is assigned a bespoke Action Dialer GUI or action dialer tool as generally depicted and referenced at 110.

Figure 10:
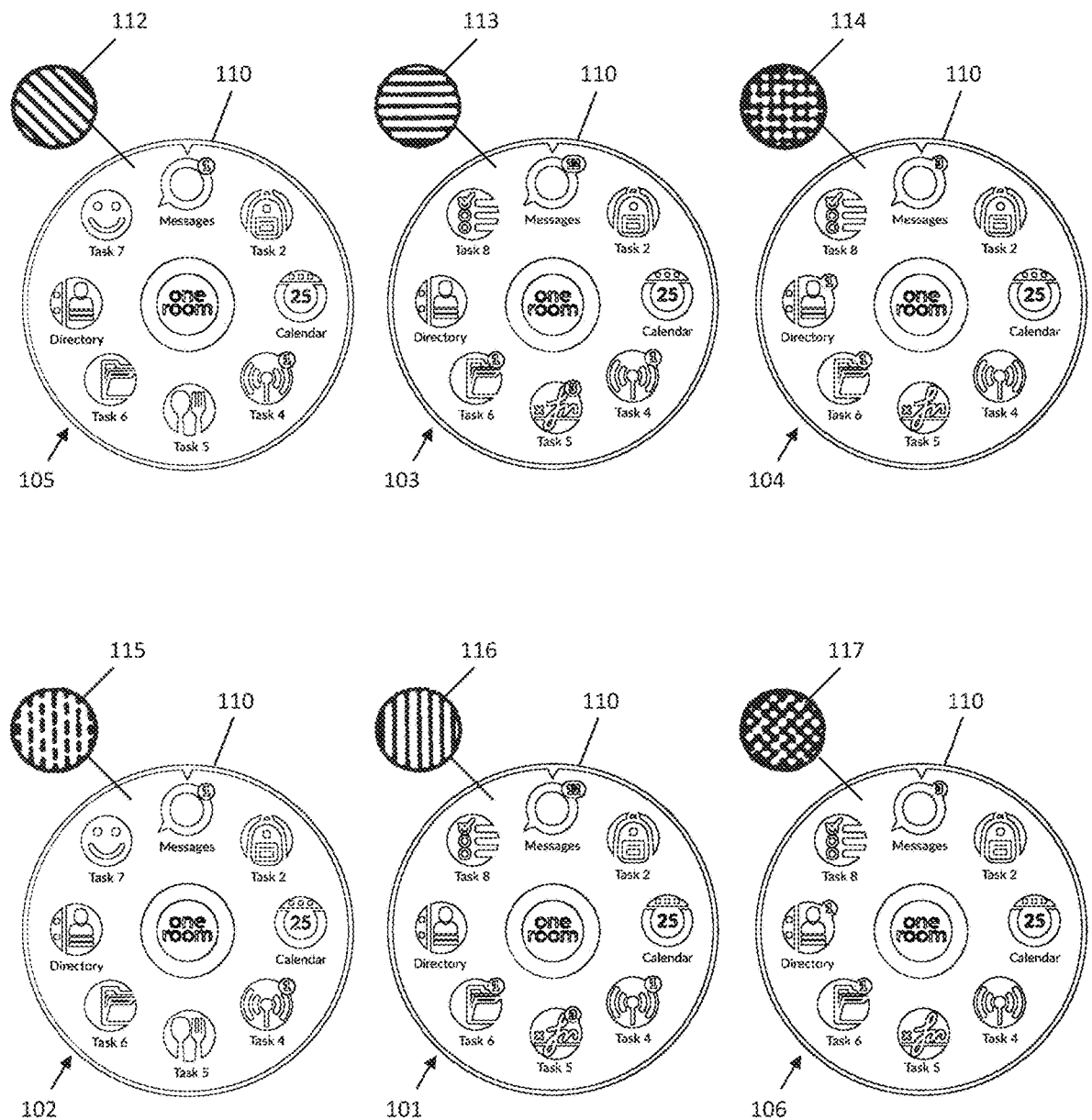
FIG. 10 is a depiction of a series of six graphical user interface dialers according to the present invention usable by a set of six user groups.

Referencing FIG. 10, for example, the reader will there consider a series of representative Action Dialers or action dialer tools 110 specific to the unique functions aligned with their organizational role and workflow, along with different levels of data accessibility based on security level permissions. FIG. 10 depicts an action dialer tool 110 for use by a set of six different education organization user groups including students as at 105, teachers as at 103, parents as at 104, office staff as at 102, district users as at 101, and community users as at 106.

Each group's Action Dialer or action dialer tool 110 is preferably distinguishable from another group's dialer by color. Each user group has a primary color with intensities chosen to enable people with varying types of color blindness (broadly protanopia/deuteranopia—both red/green and tritanopia—blue/yellow) to be able to distinguish content. For instance: within an educational context, a User Group A (e.g. students), the action dialer tool 110 might be green and have a total of 9 functions: 8 visible and 1 hidden under the "infinity line" feature(s) 161, 162, 163, 164 whereas the User Group B (e.g. teachers), the action dialer tool 110 might be blue and have 11 functions: 8 visible and 3 hidden. Referencing FIG. 10, the reader will there further consider the following hatch marking schemes or indicia depicting color associated with each of the action dialer tools 110.

Green is depicted at hatch marking 112, blue is depicted at hatch marking 113, yellow is depicted at hatch marking 114, purple is depicted at hatch marking 115, red is depicted at hatch marking 116, and orange is depicted at hatch marking 117. Each category of users may have overlapping features represented in their action dialer tool 110 however each category also needs to be instantly recognizable to the category user as being their category. FIG. 10 depicts six different instances of action dialer tool-enabling different functions. Note: the number of unique user interfaces including target audiences, colors, and function features on any given ONEROOM platform is not limited.

Figure 11:
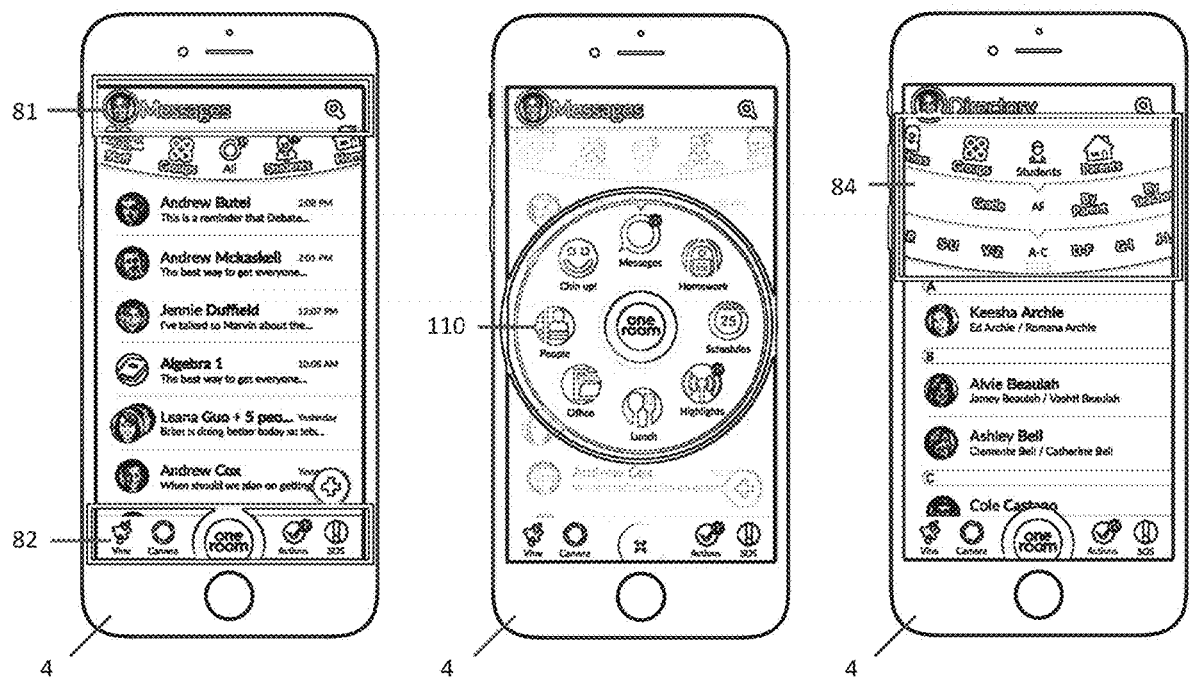
FIG. 11 is a depiction of three mobile communications devices in side-by-side relation with varied graphical user interface displays depicted upon each of the mobile communications device for ease of comparison.

Referencing FIG. 11, the reader will there consider the primary control areas of the ONEROOM platform. The device interface preferably has four primary control areas, including a masthead/upper persistent navigation bar as at 81; a lower persistent navigation bar as at 82; the action dialer tool as 110, and a drop-down tier filtering feature or filter 84. Specific details pertaining to each of these areas is explored in more detail below and in comparative reference to FIG. 12-22B. Referencing FIG. 12, for example, the reader will there consider an illustrative example of the mobile version masthead 81. The lower persistent navigation bar 82 is generally depicted in FIGS. 13A and 13B; the Action Dialer or action dialer tool 110 is generally depicted in FIGS. 14-17; and the drop-down tier filtering feature or filter 84 and aspects thereof used in explorer directory, chooser, and messaging as at 84 is generally depicted in FIGS. 18-22B.

Figure 12:
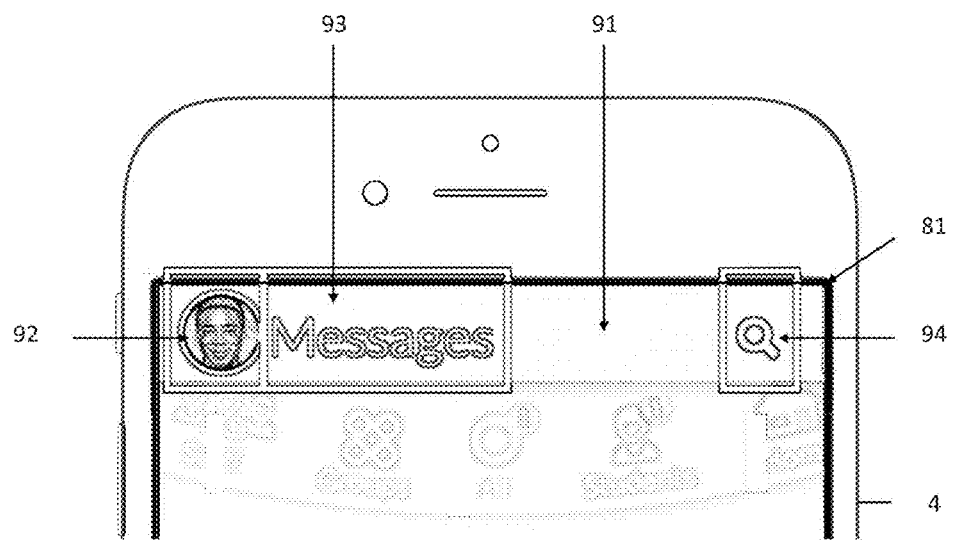
FIG. 12 is an enlarged fragmentary view of an upper portion of a mobile communications device with a masthead feature of the graphical user interface according to the present invention being highlighted for consideration by the reader.
Figure 15:
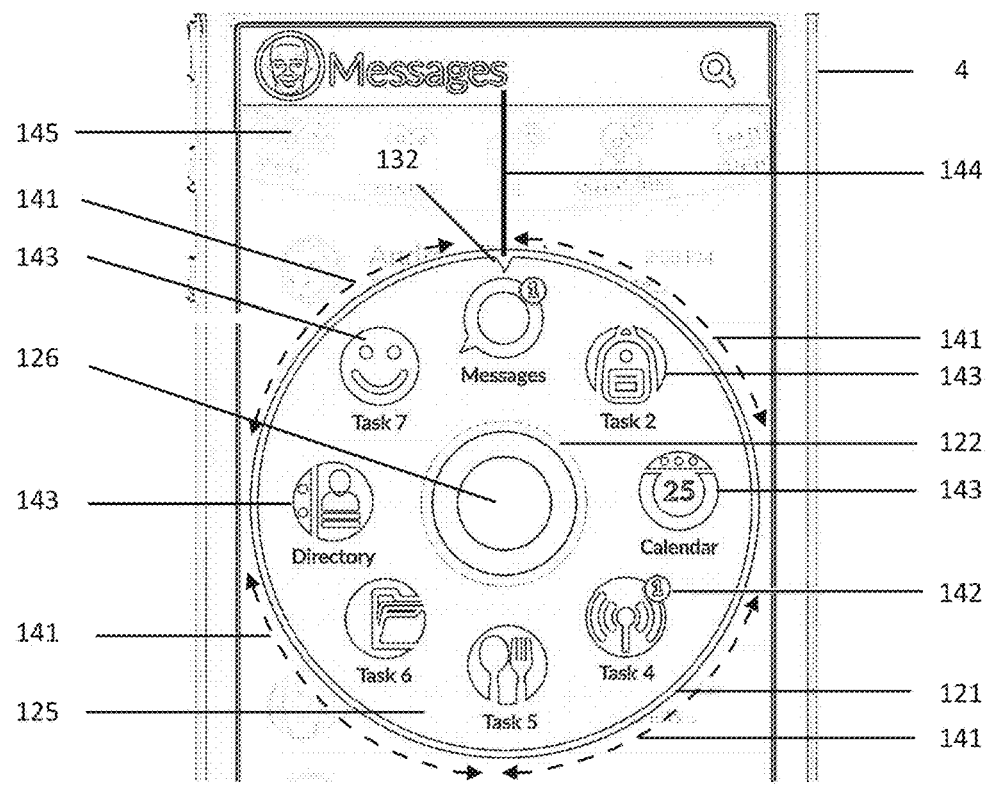
FIG. 15 is a first enlarged fragmentary view of a mobile communications device showing a preferred actions dialer feature of the graphical user interface according to the present invention.
Figure 16:
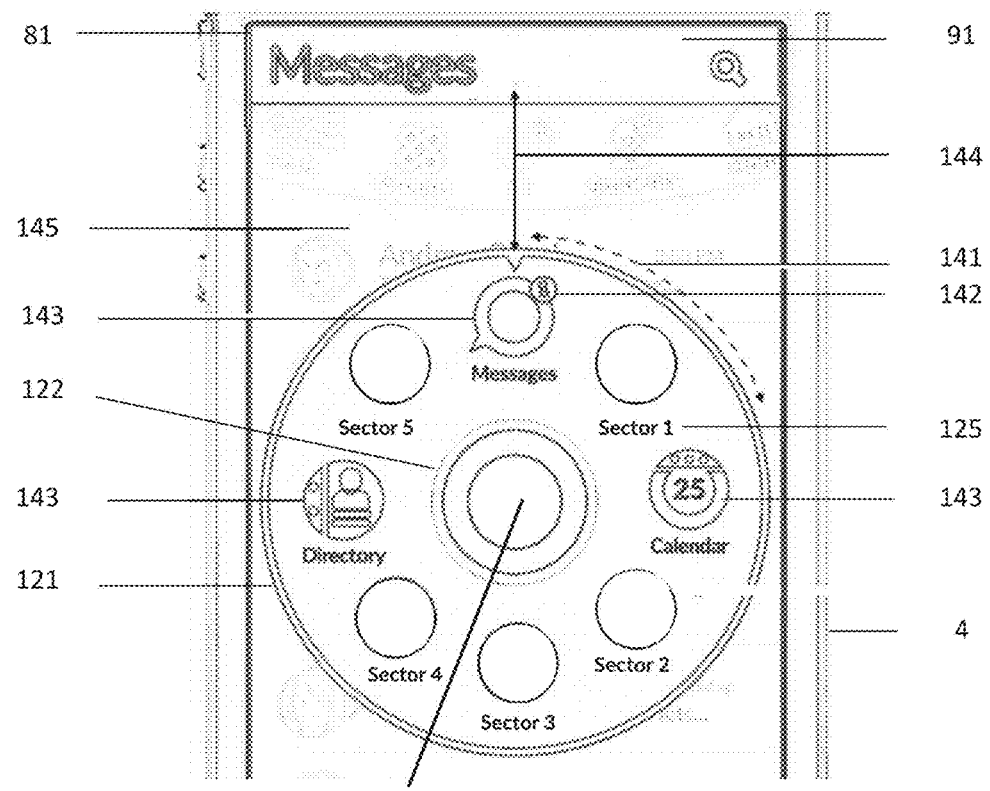
FIG. 16 is a second enlarged fragmentary view of a mobile communications device showing a preferred actions dialer with affiliate/life hub feature of the graphical user interface according to the present invention.

As with the action dialer tool 110, the masthead bar 91 of the mobile version masthead 81 in FIG. 12 is preferably of a different color for each user group. The masthead bar 91 may preferably include a persistent ID showing the authorized user's photo as at 92 ensuring there is no confusion over who is using the client device 4. This is also where users touch/tap to access/change their profile settings (e.g. edit groups or, manage favorites). The masthead title as at 93 indicates the function in which the user is currently active in (e.g. when the action dialer tool 110 sits by default at the 12 o'clock position preferably outfitted with a top notch as at 132, it is on the "message" function as generally depicted in FIG. 15). The functions either come from tapping/touching an icon on the action dialer tool 110 or via the lower persistent navigation bar 82. The position of the search feature 94 in the right corner can switch to an alternate symbol for a more appropriate option use (e.g. a forward arrow).

Figure 13A:
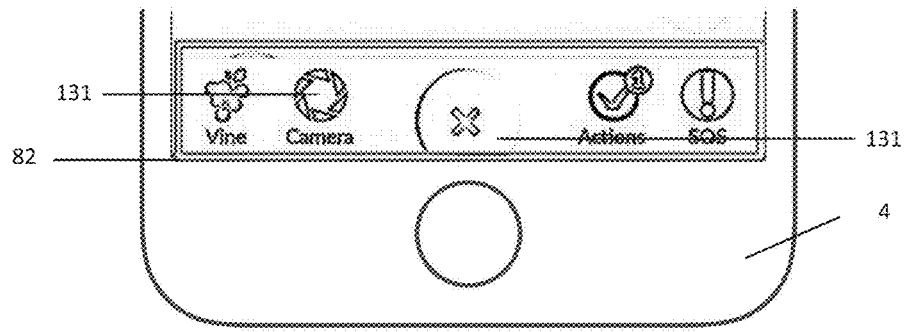
FIG. 13A is an enlarged fragmentary view of a bottom portion of a mobile communications device with a first persistent navigation feature of the graphical user interface according to the present invention being highlighted for consideration by the reader.
Figure 13B:
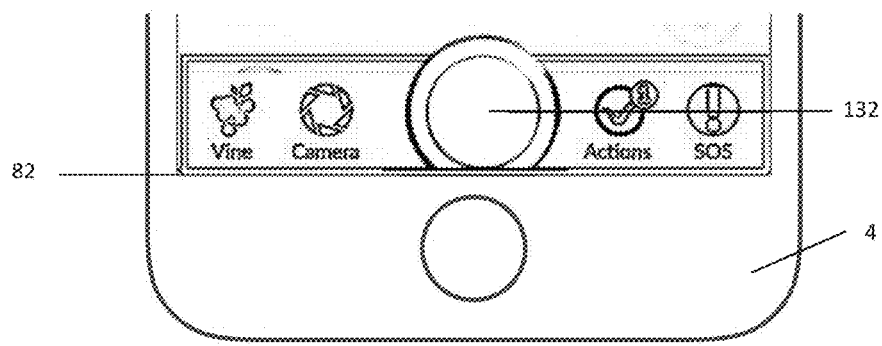
FIG. 13B is an enlarged fragmentary view of a bottom portion of a mobile communications device with a second persistent navigation feature of the graphical user interface according to the present invention being highlighted for consideration by the reader.

Referencing FIGS. 13A and 13B, the reader will there consider the lower persistent navigation bar 82 is present unless the temporary 'Selector Tool' (Compare also FIGS. 22A and 22B) swipes over and temporarily covers the page (the 'Selector Tool' is used for selecting a message recipient). At the center of the lower persistent navigation bar 82 is a circular, neutral button 131 that represents the position of oversized logo icon breaking the top edge of the lower persistent navigation bar 82. When the Action Dialer or action dialer tool 110 (which acts as the function navigation) is displayed on the screen, the center circular button on the lower persistent navigation bar 82 displays neutral button 131. This can be touched/tapped in order to open or close the Action Dialer 110.

When the screen displays a function page (e.g. a message stream), the lower persistent navigation bar 82 displays the enlarged logo icon 152 breaking above the top edge of the lower persistent navigation bar 82 so that it is easily distinguishable to the user and when touched/tapped it brings the Action Dialer 110 back to the screen. To open the Action Dialer 110, the user either taps the logo icon 152 or swipes the logo icon 152 upward. To close the Action Dialer 110, the user swipes the Action Dialer 110 downwards, taps the logo icon 152 in the center of the enlarged Action Dialer 110 or taps the neutral button 131 on the lower navigation bar 82. The icons 133 on the lower persistent navigation bar 82 represent user functions. The functions on the lower navigation bar 82 are subject to change according to the needs of an organization, however, the functions on the lower navigation bar 82 are common across all user group interfaces.

Figure 14:
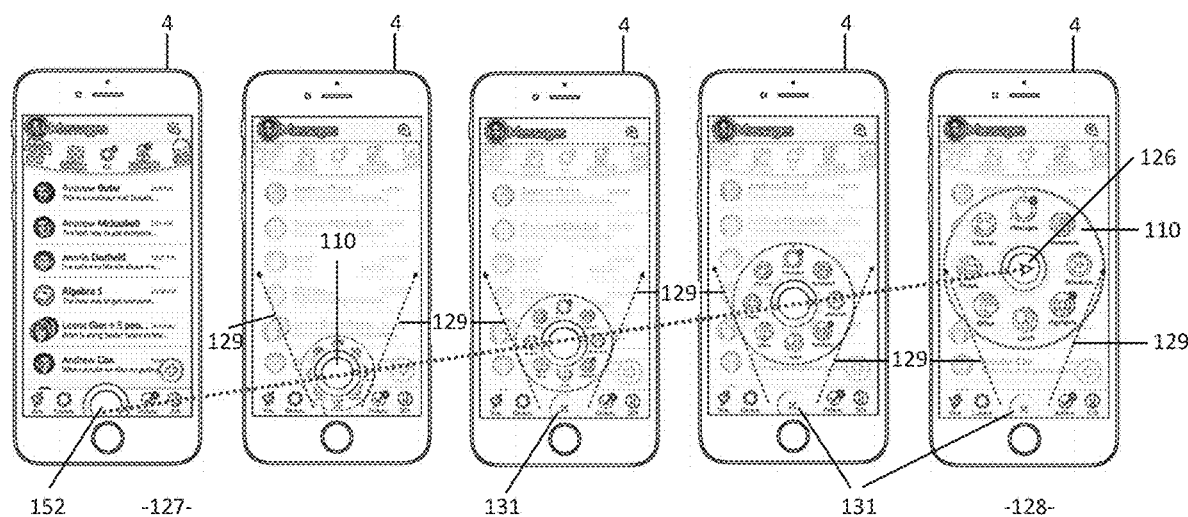
FIG. 14 is a depiction of a series of five mobile communications devices shown in side-by-side relation and depicting from left to right a dialer animation trajectory upon the graphical user interfaces.

Referencing FIG. 14, the reader will there consider an animation feature of the Action Dialer 110, rising and opening from left-to-right or lowering and closing from right-to-left. When closing, the Action Dialer 110 shrinks in animated form and drops down to the center button or logo icon 152 of the lower navigation menu 82 where the neutral button 131 is replaced with a miniature rendering of logo icon 152. Opening the Action Dialer 110 results in the reverse action with an animated rising and enlarging as at arrows 129, the Action Dialer 110 rises to the center of the screen and leaving a neutral button 131 in its place on the lower navigation bar 82. The action dialer tool 110 can be initiated from a reduced first interface position (as generally depicted at the left most client device 4 in FIG. 14 at position 127) to an enlarged operating position (as generally depicted at the right most client device 4 in FIG. 14 as at position 128).

Referencing FIG. 15, the reader will there consider a primary depiction of the Action Dialer 110 according to the present invention. This primary control Action Dialer tool 110 is used to allow the user access to unique features that are available to their user group. The Action Dialer 110 may preferably rotate left and right (unless organization regional preferences dictate otherwise). When a user touches the Action Dialer 110 with a pointing device (e.g. finger) and maintains contact with the Action Dialer 110, the user can then move the Action Dialer 110 in a clockwise or anti-clockwise direction as generally depicted and referenced at dotted arrow line 141. The Action Dialer 110 preferably tracks 1:1 with the pointer's movement.

The dialer rotation is treated as having momentum, gradually slowing when the pointing device is removed or released and coming to a stop with a function-initiating icon resting at the 12 o'clock position at the top notch 132 within a preferred time allocation (e.g. within three seconds). If the user "flicks" or spins the Action Dialer 110 rapidly in either clockwise or anti-clockwise direction then the Action Dialer 110 preferably freewheels in that direction with the same velocity as the flick, gradually reducing speed until it comes to a stop with a function-initiating icon nearest the top resting at the 12 o'clock position or top notch 132 (similar action to a prize wheel).

Turning the Action Dialer 110 may preferably be accompanied by a sound option with the ability for the user to choose a variety of customizable sounds in their profile settings or for administrators or users to disable this feature altogether. The preferable default sound is a clicking (similar to a piece of plastic card caught in turning bicycle spokes). Each time a function-initiating icon on the Action Dialer 110 passes the 12 o'clock position at the top notch 132, it clicks or provides an audible sound. When the Action Dialer 110 spins quickly, the sound preferably reacts intuitively.

Notifications as at 142 preferably appear in colored circles (extending to horizontal ovals when containing double-digit or triple-digit numbers) with the quantity of current notifications inside the circle per function or can also be marked by a simple icon to show the presence of new information. The visibility of the notifications function can be disabled in the user profile settings.

Each function available to a user group is represented by a function-initiating icon and concise label combination as depicted and referenced at 143 which is easily understood by the intended audience regardless of language and serves to determine the level of user abstraction. For instance, when the platform is being used in a singular user experience (e.g. education only) the function-initiating icons 143 represent the component feature, but if the end user is aggregating connections, the interface can be used as a 'life hub/affiliate hub' whereby the function-initiating icons 143 represent sector-specific industry, organization and/or task.

Each function-initiating icon 143 and preferably accompanying text label are grouped together and treated as a single display item which rotates in the opposite direction to the Action Dialer 110 so that the upright orientation of each function-initiating icon 143 is maintained with text label always at the bottom for enabling ease of comprehension. The background screen as at 144, which the Action Dialer 110 partially obscures, is the display of the function sitting at the 12 o'clock or top notch 132 position on the Action Dialer 110 with the function name also displayed in the masthead 81 and (color-specific) masthead bar 91 with text. As the Action Dialer 110 is rotated the background behind the Action Dialer 110 preferably moves off screen and the screen representative of the next function moving to the 12 o'clock or top notch 132 position is displayed. This repeats as rotation continues.

For instance, if the function-initiating icon 143 at the 12 o'clock or top notch 132 position is on the message function, behind the Action Dialer 110, the most recent chronologically ordered series of messages are displayed as at 145. If content is added while the user looks at the Action Dialer 110, then each row of content quietly refreshes, dropping down a row and the new content appears in the top row thereby providing real-time rendering of messages and time sensitive information.

The user can subsequently observe the content behind the Action Dialer 110 (not through the Action Dialer 110 but around it e.g. above, either side or below). The tolerances of translucency are tight so as not to be distracting and can be disabled and adjusted according to user and organizational need. The body color of the Action Dialer 110 between the exterior ring 121 and interior ring 122 in the annular formation 125 is a carefully picked level of translucency to form a heads-up display that achieves two simultaneous objectives. The Action Dialer 110 is sufficiently prominent so as to ensure that the user's eyes are first drawn to the Action Dialer 110 and its function-initiating icons/labels 143 in order to quickly select the desired function while also giving the user a glimpse of relevant information in the background.

It will thus be understood that the Action Dialer or action dialer tool 110 preferably comprises an annular formation 125 intermediate the exterior and interior rings 121 and 122, and that the annular formation 125 preferably comprises a central hub region 126 with the series of function-initiating icons 143 arranged about central hub region 126. The central hub region 126 (i.e. logo icon 152) is operable to initialize the action dialer tool 110 to the enlarged operating position generally depicted at position 128 and is further operable for reducing the action dialer tool 110 to the reduced interface position generally depicted at position 127.

Figure 17:
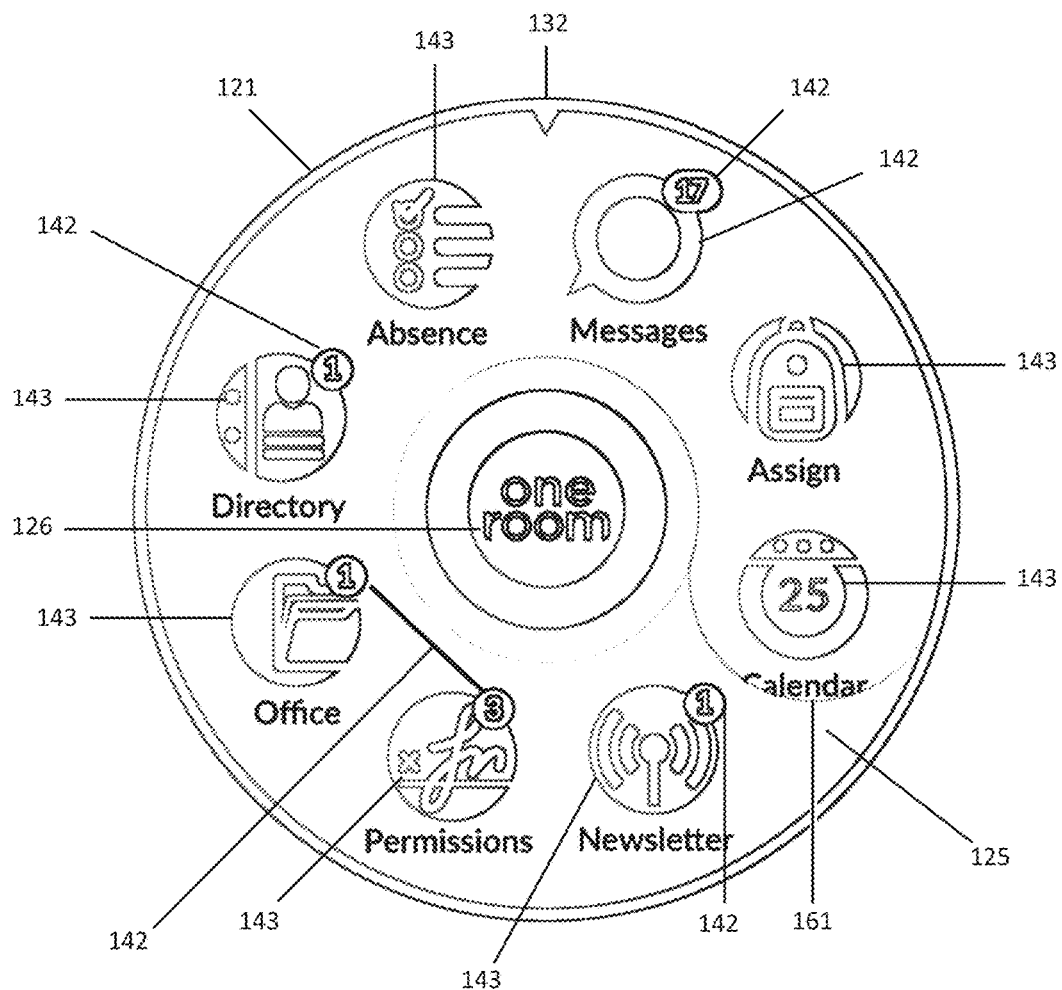
FIG. 17 is an enlarged view of the preferred actions dialer feature of the graphical user interface highlighting a preferred infinity line feature according to the present invention.
Figure 17A:
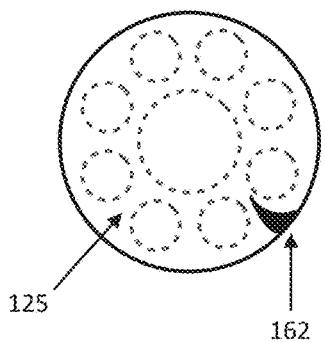
FIG. 17A is reduced diagrammatic view of a first alternative actions dialer feature of the graphical user interface highlighting a first alternative infinity line feature according to the present invention.
Figure 17B:
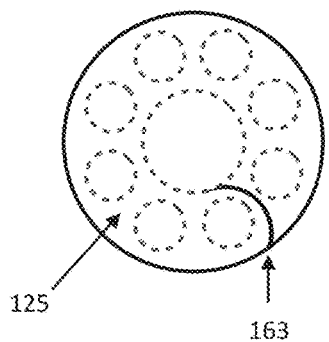
FIG. 17B is reduced diagrammatic view of a second alternative actions dialer feature of the graphical user interface highlighting a second alternative infinity line feature according to the present invention.
Figure 17C:
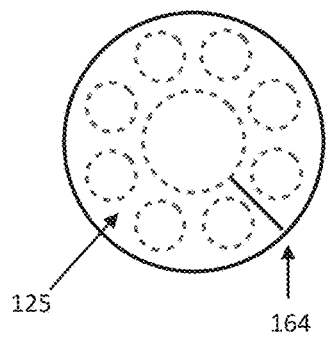
FIG. 17C is reduced diagrammatic view of a third alternative actions dialer feature of the graphical user interface highlighting a third alternative infinity line feature according to the present invention.

Referencing FIG. 17-17C, the reader will there consider an "infinity line" feature according to the present invention. In this regard, it will be noted that user groups requiring access to a relatively greater range of functions have an "infinity line" 161 added to the Action Dialer 110 (an innovation inspired by the prior art of an escalator wherein the escalator belt is more than twice as long as the visible length of the walkway/steps it spans). The design of this "infinity line" 161 can have multiple design variations (161, 162, 163, 164) including a straight line, or curved lines (convex or concave) or with a variety of shadow added. The "infinity line" or lines 161, 162, 163, and 164 are basically those points or thresholds on the Action Dialer 110 where rotating functions "drop out of sight" on the approach side of the lines 161, 162, 163, and 164 with new ones emerging on the departure side of the lines 161, 162, 163, and 164 until the user rotates the Action Dialer 110 through all the available function-initiating icons 143 and accompanying text labels.

Once all the function-initiating icons 143 and accompanying text labels are cycled through, the function-initiating icons 143 cycle again or re-emerge onto the dial face from the departure side of the lines 161, 162, 163, and 164. For instance, if a user group is granted access to 12 functions, only 6-8 icons (subject to device) are displayed on the Action Dialer 110. The additional 4-6 icons are 'hidden' under the infinity line 161 and appear when the Action Dialer 110 is rotated (e.g. when the first function-initiating icon 143 is rotated under the infinity line 161, the twelfth function-initiating icon 143 appears in view). As indicated above, the top notch 132) is the natural or default 12 o'clock stopping point of the Action Dialer 110.

Figure 20:
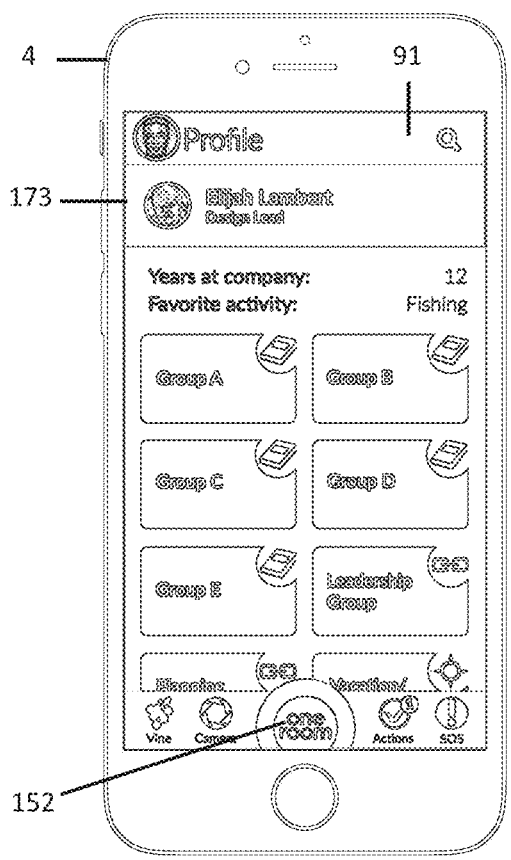
FIG. 20 is a depiction of a mobile communications device with an individual profile feature of the graphical user interface according to the present invention being highlighted for consideration by the reader.
Figure 21:
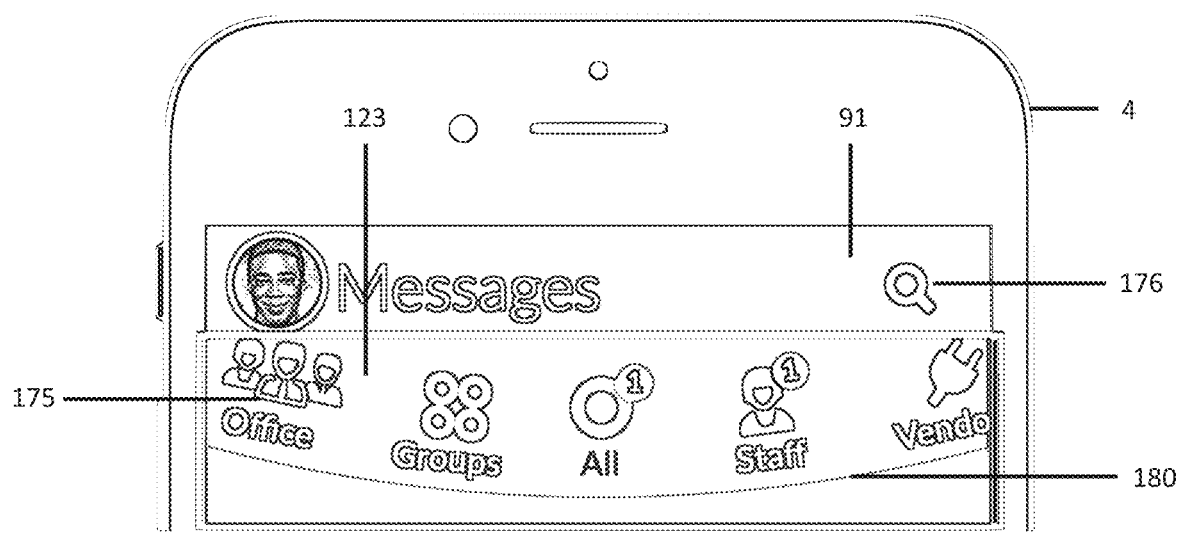
FIG. 21 is an enlarged fragmentary view of an upper portion of a mobile communications device with a message filtering feature of the graphical user interface according to the present invention being highlighted for consideration by the reader.

Referencing FIG. 18-20, the drop-down tier filter primary control feature 84 according to the present invention is depicted in three different contexts. The drop-down tier filter 84 showcases the Directory as depicted in FIGS. 18 and 18A. Multiple drop-down tiers as at 123, 182, 183 (number varies according to the size of an organization) are used in filtering user type in order to quickly and easily parse through unnecessary information. The drop-down tier navigation system is dynamic whereby each tier 123, 182,183 can be adjusted to provide the required information and filtering of information required by the user in accordance with set administrative permissions of internal and external group affiliations.

Each tier 123, 182,183 can have an infinite number of icons/labels to indicate information and acts as an infinite upper tier dial. The information is accessed by the user by moving their finger or pointing device in a left or right concave motion 181 to select the desired category. Once the relevant category (icon/label) is chosen 186, the icon/label rests under the central indicator notch or line 184 and can be tapped or press for further filtering and refining of the icon/label category.

This action causes a sub-tier to drop down 182. The user can then use their finger or pointing device in a left or right concave or arcuate motion as at 181 to adjust the sub-tier category of icon information. The number of tiers in the drop-down tier system and across the concave upper dial are adjusted according to the required need of the organization and user group. The drop-down tier(s) can be adjusted, opened and closed by placing finger or pointing device on the demarcation line 185 and using the finger or pointing device in an upward or downward motion.

Referencing FIGS. 18 and 18A, the user moves as at 181 their finger or pointing device to select the proper information icon/label on the first tier 123. The user selects the icon labelled 'groups' 186 and moves it as at 181 in line with the notch or line indicator 184. The user can then tap/touch/press this icon/label to activate the second tier 182 of information pertaining to the search query. This causes the next tier 182 to drop down. The user can then use their finger, in a left or right swipe motion 181 to move this layer to the relevant sub-category as indicated by moving the relevant icon/label 186 under the notch or line indicator 184 in the sub-tier 182. In this instance, the user selects the 'mine' label 186 and tap/touch/presses that icon/label. If another tier is applicable, it will appear to further filter the sub-category. If this is the limit of the filtering, the information will appear on the screen 187 behind the tier system.

The user can close the tier system either by holding their finger on the demarcation line 185 and swiping in an upward motion or simply by holding their finger or pointing device on the background screen 187. The upper tier 123 of the navigation bar remains in place as a point of reference for the user. The multiple drop-down sub-tiers 123, 182, 183 are preferably defined by concave borders as at 180 as viewed relative to function-initiating icons 143 displayed within each sub-tier 123, 182, 183. The user is able to adjust a select sub-tier by touching and maintaining contact therewith and moving the select sub-tier 123, 182, and 183 in an arcuate motion, the sub-tiers thereby providing side-to-side rotation for function selection after drop down motion(s) and sub-tier activation.

In the case of the Directory, the feature systematically identifies specific data leading to group profiles as depicted in FIG. 19 or individual profiles as depicted in FIG. 20. Group profiles as at 171 display a range of data including all the individuals in the group. Individual profiles as at 172 display a range of data including all the groups with which an individual is associated. Within these profiles there is a range of information ranging from basic low security levels of information up to high level security details available to user groups with the appropriate permissions. An individual profile contains a user's photo, name and any information relevant to their role in the organization as at 173.

For example, in an educational organization, an individual student profile displays grade level, parent/guardian name and any groups they are involved in (e.g. classes, sports teams, etc.). A group profile as in FIG. 19 contains a group icon, title and any relevant information (e.g. room number or team leader) alongside an optional description of the group purpose and drop-down folders that show further information pertaining to group leaders (e.g. teachers, managers, etc.) and for authorized users, to add file notes, calendar events or other relevant information as at 174. The initial set-up of the directory is done by administrative users with appropriate permissions set (e.g. in education, parent users would not be given access to student users apart from their own children) and to ensure all user details are pre-populated for immediate value on first use.

Comparatively referencing FIGS. 13A, 13B, 15 and 21, the reader will there consider that when a user taps a function-initiating icon 143 either via the Action Dialer 110 (FIG. 15) or from the lower persistent navigation bar (FIGS. 13A/13B), where relevant a sub-tier 123 appears to enable the user to filter their next desired action. For instance, in messaging, the preferably concavely bordered (as at 180 as viewed relative to icons displayed within the) tier(s) 123 display icon categories that enable rapid filtering of messages by user group or clusters as at 175. Categories such as 'favorites' allows for rapid custom filtering of favorite individuals or groups. The search tool 176 in the masthead/upper persistent navigation bar 91 provides further comprehensive text-predictive search across all individuals and/or groups by keyword.

Figures 22A, 22B:
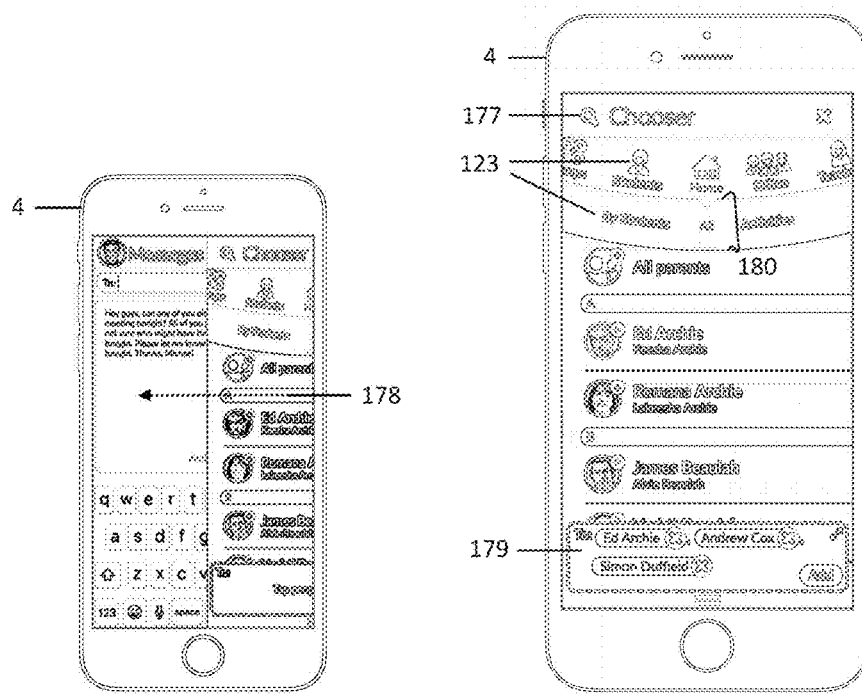
FIG. 22A is depiction of a reduced mobile communications device with a chooser or selector function feature for selecting recipients of the graphical user interface according to the present invention being highlighted for consideration by the reader.
FIG. 22B is depiction of an enlarged mobile communications device with search and predictor box features of the graphical user interface according to the present invention being highlighted for consideration by the reader.

Referencing FIGS. 22A and 22B, the reader will there consider that the ONEROOM platform is built around the ability to communicate with any other permitted users within the organizational ecosystem. The tiered menu is used to find and identify recipients. In order to communicate with another user, the user who wishes to communicate taps 'to' in the messaging function and the Directory Selector screen 178 slides into view. Although it looks and behaves like the Directory function, it is used for selecting with whom—i.e. the individual(s)/group(s)—the user wishes to communicate.

Alternatively, users can begin to type the user keyword into the 'to' text box and potential user's names are auto predicted as at 179. The ability to search for a user in the directory is also permitted as at 177. Users are able to send the following types of messages: 1:1 messages—one individual to another individual; 1:2+—user sends a message to a number of individuals as part of a group conversation; 1:2+ as individual messages–a single message is created, and a number of individuals are selected but each receive the same message as a one-to-one communication; 1:all—a message is created, a group is selected and all individuals in the group receive the message either as individual messages or as part of a group conversation.

Onboarding User Groups

Figure 9:
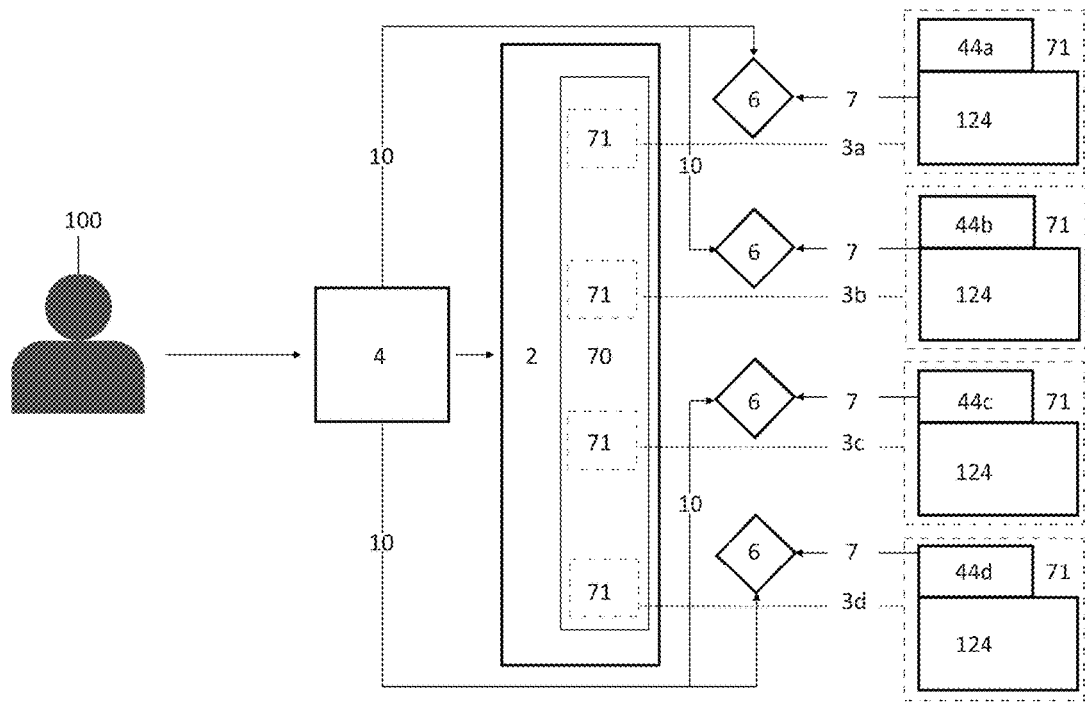
FIG. 9 is a flowchart diagram depicting a decentralized user-owned platform according to the present invention.

Secure, self-contained access to the ONEROOM communications platform is preferably granted through a physical identity verification process. The physical verification process can be initiated by an end-user or administrative user groups. End-user physical verification initiation operates to create a decentralized personally owned platform via connection between the end-users and other users/organizations preferably through a Quick Response key or QR key as generally depicted in FIG. 9. The administrative user groups (or those with the ability to set permissions or enter database information) act as the gatekeepers of those allowed onto the ONEROOM platform.

This creates an 'iron bubble' that ensures the integrity and security of users and places the responsibility for the content, actions and consequences of actions of those on the platform with the organization rather than with ONEROOM brand or owner. The client organization and users are responsible for the 'policing' and dealing with inappropriate behavior—but given that it is an iron bubble—what happens in the bubble does not go beyond the 'iron bubble' into the wider Internet. Certain content (e.g. inappropriate words or inappropriate photos) can be blocked according to set permissions either by ONEROOM or by the user organization according to sector. For example, within a medical context it would not make sense to block certain anatomical photographic content whereas in an educational context it might make sense to block certain anatomical photographic content.

Figure 7:
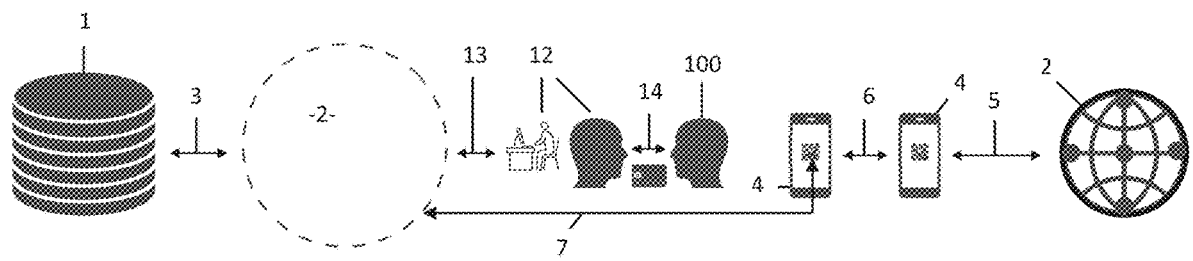
FIG. 7 is a visual flowchart diagram of the primary platform on-boarding process according to the present invention.

Referencing FIG. 7, an unlimited number of internal or external users of this invention can be onboarded into a single, secure, decentralized yet definable communication from any location—local or remote. Permitted users, along with their location and level of access to the organization's communication platform, are determined by the client organization. External information databases 1 provide the core data for the ONEROOM platform system. This data is imported as at 3 into the remote abstraction layer, service or system 2 of the ONEROOM platform and the data is further refined and where applicable, tagged by the organizational administrator client 12 to take into account inaccuracies (e.g. duplication or spelling errors) and tagged and mapped to create user groups and permissions as at 13.

Once complete, the invention will onboard individual users via an initial step of face-to-face verification or communication means as at 14 between the admin client 12 and regular clientele 4 backed by government issued documentation and then via device activation as at 6. Once the application has been downloaded onto the client device 4, they are connected to the platform through a Quick Response Code (QR Code) on the client device 4 that connects as at 5 the user to the communication platform via the client device 4 to which the QR Code was sent as at 7 via remote server authentication credentials (e.g. secret/public key).

No personal information such as an email or phone number is used for either the onboarding of users into the communication system or for communication with users once they are within the platform. This process is what allows secure entry of additional users, especially external affiliates, with varying degrees of connectedness to the community into the existing organizational communication platform and through the database management component, into the storage of data. All communication, record keeping and data transmission functions are traceable and verifiable because of the secure onboarding process.

Two-Step Verification Replacement

Two-step verification (also referred to as two-factor authentication or 2FA) is a second layer of security to protect an account or system. Two-factor authentication or 2FA increases the safety of online accounts by requiring two types of information from a user (e.g. password, PIN, fingerprint) before the user may log into a system. Two-factor authentication or 2FA confirms a user's claimed identity by utilizing something with which the user is personally familiar, and a second factor other than something with which the user is personally familiar. Initial onboarding and acceptance of users into the ONEROOM system is through face-to-face identity verification. In addition, users have the option to set up additional security measures such as 2FA via traditional means (e.g. security PIN or phone thumbprint/face recognition/squiggle). In certain instances, and industries, 2FA can be replaced with a close proximity microchip.

Identity Authentication VIA Microchip or Secure Enclave

Figure 8:
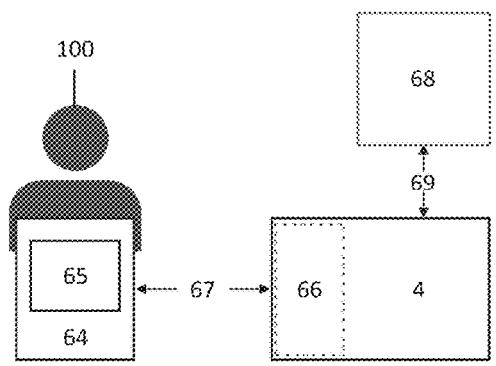
FIG. 8 is a flowchart diagram depicting a process of identity verification via a microchip feature according to the present invention.

Referencing FIG. 8, the reader will there consider a microchip-based user identity authentication feature according to the ONEROOM platform system basically comprising two components: a transponder with near-field communication (NFC) microchip transponder as at 65 and a near-field communication (NFC) reader or scanner 66. The ONEROOM platform system may preferably incorporate such technology into certain application scenarios and thereby provide a reader/scanner 66 that authenticates a user for acceptance into the closed community. The microchip transponders 65 are existing microchips built on radio frequency identification (RFID) systems that use low-frequency radio signals to communication between the microchipped item or person 64 and reader or scanner 66 outfitted upon the client device 4 or otherwise carried by the user.

The microchip transponder 65 is passive (meaning it contains no battery or energy of its own and has a very long life and no maintenance) and is inactive until the reader activates it by sending it a low-power electrical charge. The reader 66 "reads" or "scans" the chip and receives back data (in this case an identification number) from the chip. The microchip stores a unique identification number from 10 to 15 digits long. American Veterinary Identification Devices or AVID's, which produce chips for pet identification claim their chips, using a nnn-nnn-nnn format, have the capability of over 70 trillion unique numbers.

The unique ID number is "etched" or encoded via a laser onto the surface of the microchip before assembly. Once the number is encoded it is impossible to alter. The microchip transponder 65 also contains the electronic circuitry necessary to transmit the ID number to the "reader" 66. The reading or activation range, between reader and microchip is small and requires close proximity 67 between microchip transponder 65 and reader/device 66. Authentication may also be via embedded data held inside a secure repository inside software on a device without the physicality of a microchip. In this instance, a secure enclave or location within firmware on a device enables activation.

Devices & Date Flows

Flows of data are differentiated between "access to" data versus "input of" data from the computer point of view. Two types of user interfaces are utilized: (1) touchscreen devices controlled by finger/pointer tapping and/or gestures (e.g. touch screen phone) and those controlled by mouse movement and/or clicking (e.g. desktop computer with a keyboard and pointing device). Both interface types connect to the same ONEROOM platform system. The ONEROOM platform system according to the present invention preferably provides multiple functions which can be categorized as: (1) Functions internal to the invention; (2) Third-party functions integrated into the invention (e.g. payment processing); and (3) Third-party functions linked to the invention but that operate outside of the invention itself (e.g. news feed).

Database Management System

The database management system allows users with multiple levels of access to review and/or edit data placed on existing data storage facilities throughout the communication system in accordance with their assigned authorities and permissions. Original records, data and communications remain in the data storage mediums to protect the integrity of the information and authenticity of the transaction. Users are granted access to authorized information, data and communications in the data storage medium to view information and data or execute documents as appropriate. Records, data and communications may not be sent or shared outside the communication system except as expressly authorized.

Machine Learning is a current application of Artificial Intelligence or AI based around the idea of giving machines access to data and let them learn for themselves. An example of its application within the ONEROOM platform system is the gathering of information from diverse data points (and systems) to answer user questions via voice chat, chatbots or the daily summary feature. The ONEROOM platform preferably incorporates the capabilities of a voice-activated user interface based on information within the system gained through AI and enables the user to access information directly from the platform or via integration with other cloud-based voice-activated services (e.g. AMAZON Echo known colloquially as "Alexa").

Data Storage Facilities

Data storage mediums connected to this communication platform include existing storage mediums either maintained, used or contracted by the client, in this manner the data is centralized in that the platform provider does not access, manipulate or mine or the data within the organizational platform except for the provision of analytics or services to the organization. Data is stored on the client's internal facilities or via an external service provider in legal compliance with any regional, national or international data requirements. Any information not contained on an existing data storage medium or generated by this invention and not written to an existing data storage medium, is held on a data storage medium maintained or contracted by this invention specifically for user data, records and communications within the client's community.

Location Based Proximity Alerts and Services

FIG. 8 generally depicts the use of user identification via microchip technology or a secure enclave to enable access via location-based proximity beacons or sensors 68 transferring data via Bluetooth low energy technology (BLE). Location based proximity alerts connected to this communication system include iBeacons and/or other bluetooth/ Bluetooth Low Energy (BLE) or equivalent technologies 69 used for the express purpose of validating proximity of users for management information (e.g. attendance) or access to facilities or resources (e.g. library). In these instances, the invention has the technical capability to act as the equivalent of digital swipe card providing access to facilities, resources according to organization permissions and user role.

Emergency Voice & Data Event Recorder & Transmitter

A component feature of the invention is the ability to record events which can be activated by users (according to organizational permission) in the event of an incident (e.g. aggressive behavior in a classroom). Activating via a custom gesture on the client device 4 places a signal to commence with the recording (voice or video according to user and set permissions). This component can be used for the purpose of investigating accidents and incidents.

This component is based on the prior art of standard Cockpit Voice Recording devices used as an air safety measurement which records the signals of the microphones and earphones of pilots' headsets and cockpit area, with the capability of recording four channels of audio data for a period of two hours. Depending on user case, this invention provides for authorized users to mute ringtones, remotely disable electronics and activate the voice/data/Internet Protocol or IP address and camera (still or video) and transmit directly to assigned external users or organizations.

End-Use Operational Hub

The invention has multiple levels of user-centric abstraction. On the one hand it is a communication hub that enables for streamlined communication and workflow management within a defined community. On the other hand, it recognizes that end-users will interact with multiple organizations and communities and can operate as a 'life hub' for end users. A mobile-first filing system for all communication, information and data in accordance with the users' interaction with organizations and communities. The ONEROOM hub becomes the operating system for daily life and the dialer components would consist of multiple differing features and market sector categories.

For instance, Kathy is a 38-year old occupational therapist with three school aged children. Her elderly mother is in a nearby care home. Kathy might have a life hub dialer with the key components being work (employment organization, clients), home (access to insurance/utility providers), retail experiences (access to favorite shops/restaurants), school (education), healthcare (doctor, dentist), travel and church. Since all these organizations are organization with which she is affiliated, the organizations are listed in her directory (a personal 'yellow pages') and enable her to communicate directly with users from this diverse range of organizations within a single personalized ONEROOM platform. Within this, she could also have a list of favorite affiliates or services that she regularly uses (e.g. AppleMusic, Amazon, Uber and Walmart).

FIGS. 7 and 9 comparatively depict the use of the invention as a decentralized personally-owned platform wherein a single user 100 can enable users into their own platform or information hub. The on-boarding process is similar to that at an organizational or community level but enables a single user 100 to allow other organizations to communicate with them in a streamlined manner. The user 100 invites an external organization to connect into their remote abstraction layer, service or system 2 via the personal identity verification process 6 (outputting authentication credentials 7/8) and personal identification document verification process 10 and connections with the organization(s) 124 (associated with information systems as at, for example, 1.a, 1.b, 1.c) in cooperation with remote server authentication credentials 7 (secret key, public key, etc.).

Any organization information is filtered into the relevant Organization/Industry or Market Sector ONEROOM platform system components 71 featured on the remote abstraction layer, service or system 2 within the graphical user interface 70. The components 71 are aggregated from numerous market sectors or affiliates that have implemented the ONEROOM platform system. Bi-directional information and CRUD interactions are enabled between user and organization(s) (3a-d).

More generic, publicly available information can be extracted from permitted websites or social feeds into the relevant components within the personalized platform. For example, Kathy has permitted her favorite clothing retailer onto her personalized platform and can allow information from the retailers social feed to appear in her personalized social stream. The content of the retailer's page may be parsed, searched, reformatted into a digestible format for Kathy according to her interests.

Sector Application Discussion

ONEROOM is the master brand for the platform invention and the invention can be applied to organizations within multiple industries or market sectors. The Graphical User Interface of the ONEROOM platform provides a comprehensive platform for communication, managing engagement and mobile-first task execution in a multi-party user-centric format that gives users ownership of their data. The ONEROOM platform streamlines communication by providing an organization with a single source for communicating, managing workflow processes, record tracking and data transmission and provides real-time connection between multiple user audiences with private transparency according to set levels of authorization and permission.

The technology incorporates the use of distributed ledger technology and machine learning to enhance the user experience. A number of use cases exist for this technology. The various industries which have been identified can be broken into six market categories which may be broadly defined as including (1) an Education sector; (2) a Business & Finance sector; (3) an Arts, Entertainment & Media sector; (4) a Government & Justice sector; (5) a Religion & Relief sector; and (6) a Family & Personal Life sector.

The following use cases are examples of how the ONEROOM platform can be used in organizations within these sectors, they are presented in no particular order. Note: this is not an exhaustive example list, the ONEROOM platform is a comprehensive communication platform for any industry, community or organization with multiple stakeholders interacting around common goals. In all applicable cases 'it' refers to the ONEROOM platform.

Education Sector: OneRoom Education

Referencing FIG. 23, the reader will there consider a series of six client devices 4 outfitted with the software application supporting the present platform, each of which client devices 4 are depicted with its graphical user interface highlighting the Action Dialer 110 feature or tool according to the present invention. Gaining a quality education requires perseverance on the part of students, parents, teachers, administrators and communities (key stakeholders and user groups in education).

The ability to actively engage stakeholders over minimum a 12-year life span is dependent on an education system that is relevant and engaging. Current education systems are increasingly struggling with engagement across its three most critical user groups: students, teachers and parents. In the USA, over 5,000 students drop out of American schools every day, 40% of parents never attend a school event and a recent Gallup Poll found that 70% of teachers admit to being disengaged. Research shows a direct link between parent engagement and student success.

A key element to ensuring better engagement is providing a holistic, effective and engaging communication experience with a streamlining of information whether inside or outside of the classroom, and the provision of greater opportunities for community and connection both inside and outside the school. The present invention provides a comprehensive communication platform for the six major user groups within an educational community: district administrators, school administrators, teachers, students, parents and community groups/associated persons (e.g. social workers). It provides a single source interface for twenty-five plus communication, record keeping and data transmission functions necessary for the successful operation of an engaged and efficient school community.

The present invention provides a single source interface for all of the communication, record keeping and data transmission functions necessary for successful operations within the specified education industry with an engaged consumer base. The present invention ensures transparency by making all communications and transactions traceable and verifiable to a user according to the appropriate level of authorization and permission granted to them by the platform keyholders (administrators). The present invention enables validation of the proximity of users for management information (e.g. attendance) and ability to act as the equivalent of digital swipe card access to secured facilities and services (e.g. library or transportation services).

Travel Industry

Figure 24:
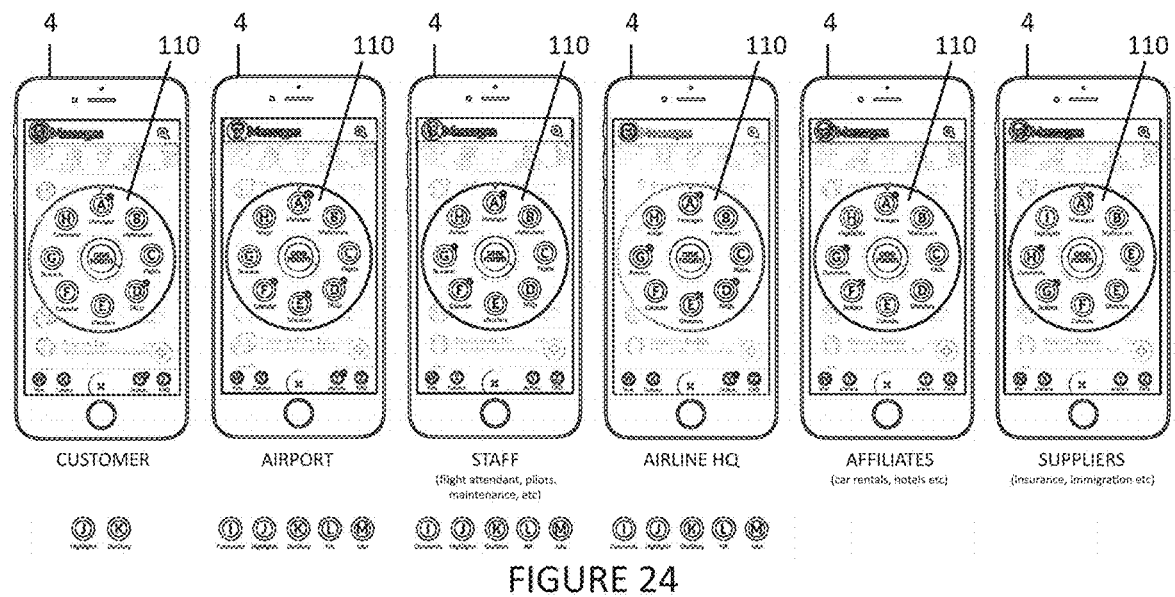
FIG. 24 is a depiction of a series of six reduced mobile communications devices each of which show an actions dialer feature of the graphical user interface for various travel or airline industry user groups.

Referencing FIG. 24, the reader will there consider a series of six client devices 4 outfitted with the software application supporting the present platform, each of which devices are depicted with a graphical user interface highlighting the Action Dialer 110 feature or tool according to the present invention. The common goal of the travel industry is ensuring the customers have a safe journey when moving from Point A to Point B. This involves numerous stakeholders ranging from airlines, airports, safety organizations (e.g. FAA and DHS) and suppliers including travel agents (on or offline). A "ONEROOM Travel" platform provides a customer-centric communication platform that enables easy user engagement, communication, record keeping and data transmission to enable users to benefit from a streamlined travel experience across multiple stakeholders involved in ensuring the provision of a successful journey.

The present invention enables users to be more engaged in their journeys providing a single source hub for travel needs. The present invention ensures transparency by making all communications and transactions traceable and verifiable to a user with the appropriate level of authorization and permission. Audiences identified (but not limited to) include: Travelers, Airlines, Airport Operators, Safety Organizations, Suppliers and Airline Staff. Beyond the core components (FIGS. 6a-6l), functions identified as relevant to the airline industry include (but are not limited to): Messaging, Travel information, Calendar, Offers, Airport maps, Customer Support, Booking engine, Local info, Transportation services, insurance details etc.

A ONEROOM Travel platform provides (a) a single source interface for all of the communication, record keeping and data transmission functions necessary for successful operations within the airline industry with an engaged consumer base; (b) a real-time connection between the different companies involved in the manufacturing and sales of aircraft, third party providers of goods and services to the airline industry as well as the airlines that fly the aircraft and their customers; and (c) ensures transparency by making all communications and transactions traceable and verifiable to a user with the appropriate level of authorization and permission.

Automotive Industry

Figure 25:
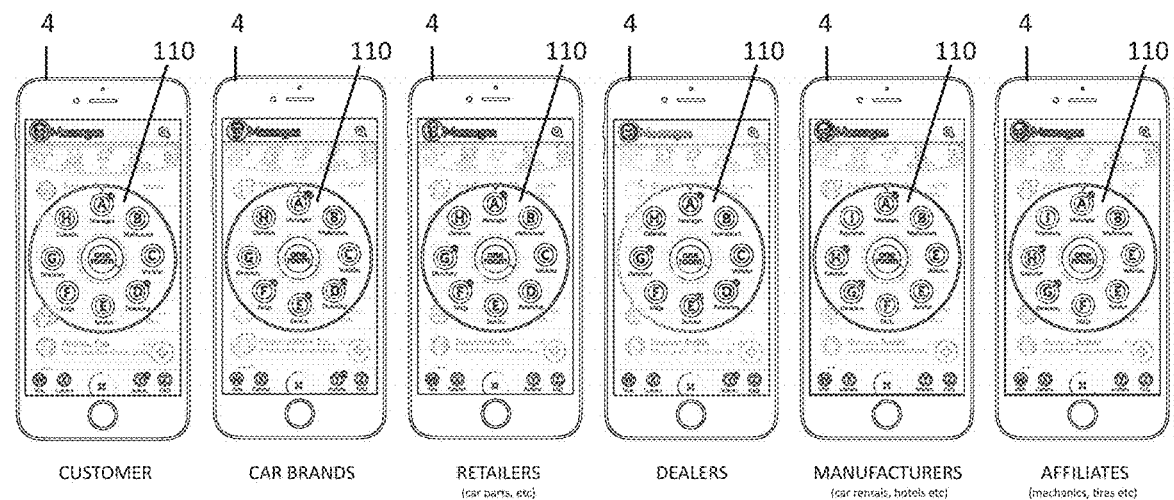
FIG. 25 is a depiction of a series of six reduced mobile communications devices each of which show an actions dialer feature of the graphical user interface for various automotive industry user groups.

Referencing FIG. 25, the reader will there consider a series of six client devices 4 outfitted with the software application supporting the present platform, each of which devices are depicted with a graphical user interface highlighting the Action Dialer 110 feature or tool according to the present invention. The present invention provides a comprehensive communication platform for the administration of car dealerships including communication and engaging with customers, manufacturers and sellers. The present invention provides users with a single source interface for all communication both internal and external to an organization including record keeping and data transmission functions necessary for the successful operation of organizations within the automotive sector.

In particular, the present invention (a) provides a single source interface for all of the communication, record keeping and data transmission functions necessary for successful operations within the auto industry with an engaged consumer base; (b) provides a real-time connection between all relevant companies including but not limited to those involved in the manufacturing and sales of automobiles and the individual purchasers of their goods and/or users of their services; (c) ensures transparency by making all communications and transactions traceable and verifiable to a user with the appropriate level of authorization and permission; and (d) provides a navigation interface and display feature that can be integrated and installed as an in-vehicle interface displays (dashboard) allowing access to functions such as music, maps, temperature control etc.

Churches & Community Groups

Figure 26:
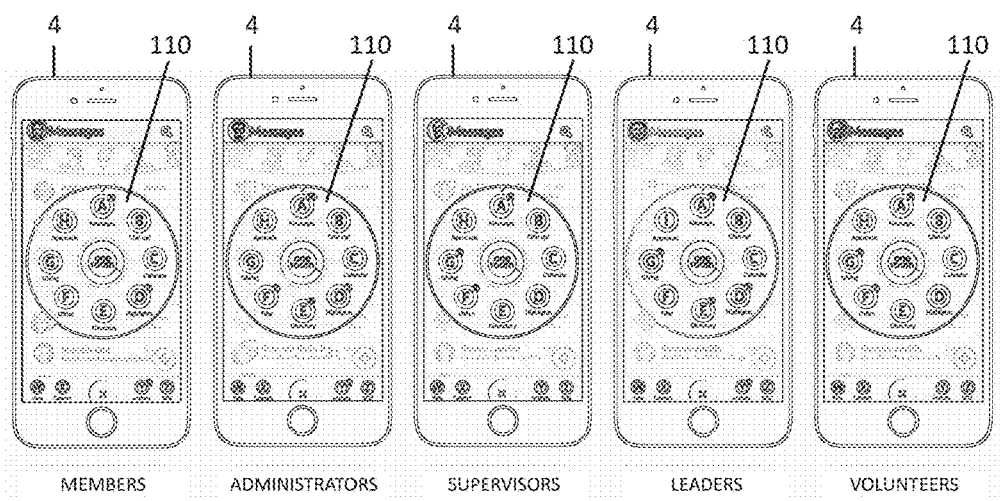
FIG. 26 is a depiction of a series of five reduced mobile communications devices each of which show an actions dialer feature of the graphical user interface for various religious or community group user groups.

Referencing FIG. 26, the reader will there consider a series of five client devices 4 outfitted with the software application supporting the present platform, each of which devices are depicted with a graphical user interface highlighting the Action Dialer 110 feature or tool according to the present invention. ONEROOM Community provides a real-time connection between all relevant parties and ensures transparency by making all communications and transactions traceable and verifiable to users with the appropriate level of authorization and permission.

The present invention provides (a) a single source interface for all communication, record keeping and data transmission functions necessary for the successful operation of an engaged church or community; (b) a real-time connection between all relevant parties, including but not limited to staff, its members and the community at large, including contractors and service providers used by the group; (c) ensures transparency by making all communications and transactions traceable and verifiable to a user with the appropriate level of authorization and permission; and (d) provides and enables validation of the proximity of users for management information (e.g. attendance) and acts as the equivalent of digital swipe card access to secured facilities and services.

Government Services Administration

Figure 27:
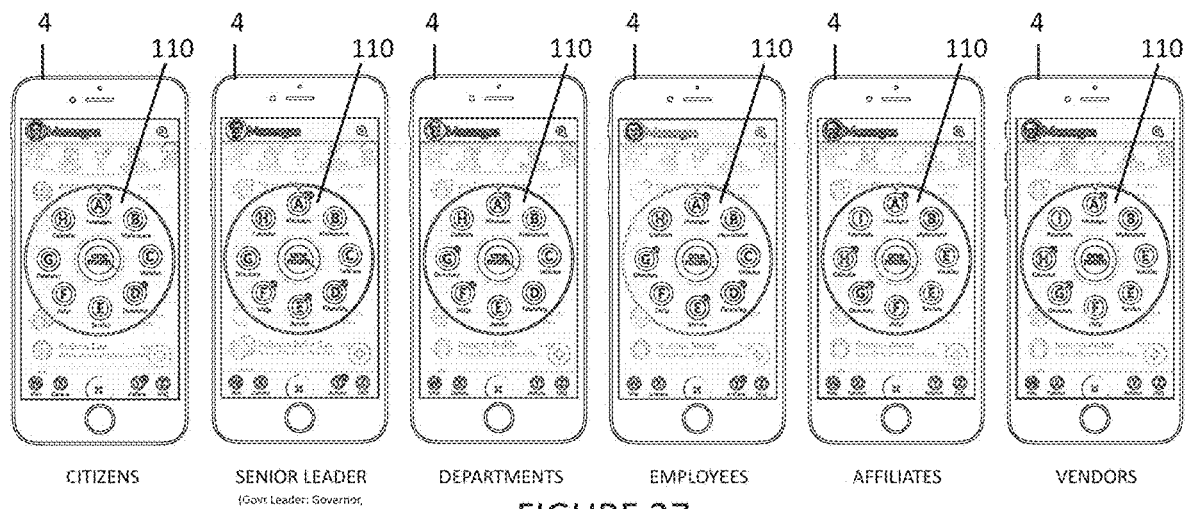
FIG. 27 is a depiction of a series of six reduced mobile communications devices each of which show an actions dialer feature of the graphical user interface for various local government/government services administration and user groups.

Referencing FIG. 27, the reader will there consider a series of six client devices 4 outfitted with the software application supporting the present platform, each of which devices are depicted with a graphical user interface highlighting the Action Dialer 110 feature or tool according to the present invention. The ONEROOM platform has the ability to be designed according to the needs of multiple organizations and departments in the provision by local, regional, state and national/federal government of services to their constituents and citizens. This invention provides a comprehensive communication system for parties involved in the administration of city government, state government and national government including but not limited to governmental departments, individuals that use the services of city government, or contractors that provide services to the government.

The present invention provides a single source interface for all of the communication, record keeping and data transmission functions necessary for the successful internal operations of engaged citizens. The present invention provides a decentralized information structure that enables the highest level of security and data privacy centered around the integrity of user information, interactions and privacy.

The present invention can provide a real-time connection and transfer of information between local government departments and individual users of government services. For instance, the flexibility of the interface provides citizens with direct task execution abilities (e.g. paying property/council tax or parking fines). The present invention ensures transparency by making all communications and transactions traceable and verifiable to a user with the appropriate level of authorization and permission via a unique user identifier (UUI).

Hospitality Industry

Figure 28:
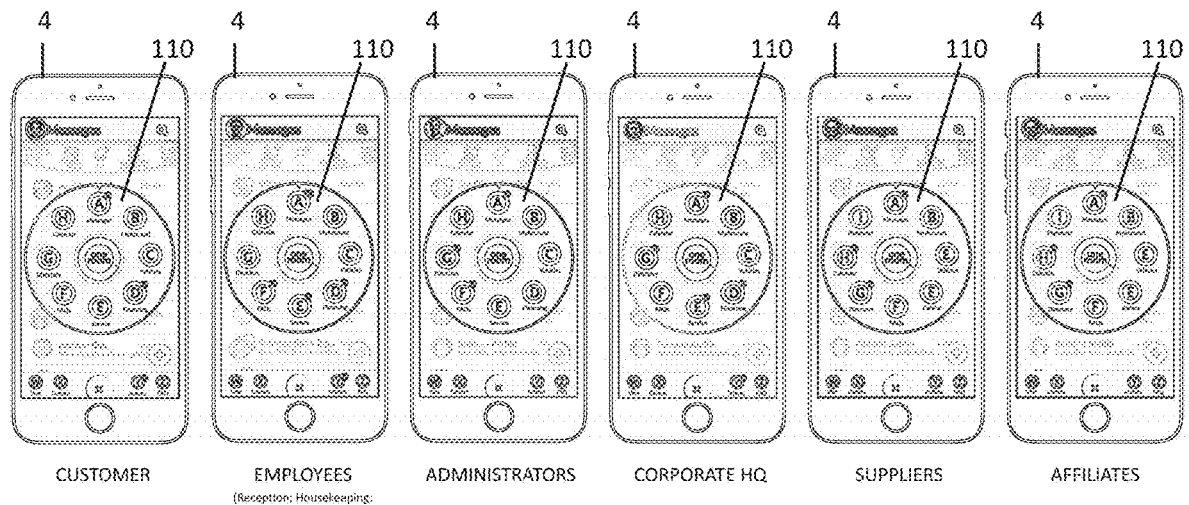
FIG. 28 is a depiction of a series of six reduced mobile communications devices each of which show an actions dialer feature of the graphical user interface for various hospitality or hotel industry user groups.

Referencing FIG. 28, the reader will there consider a series of six client devices 4 outfitted with the software application supporting the present platform, each of which devices are depicted with a graphical user interface highlighting the Action Dialer 110 feature or tool according to the present invention. The present invention provides an engagement platform for hotels and consumers by providing users with a single source interface for the communication, record keeping and transmission of information between the various user groups working within and using the services of the hotel/service industry.

ONEROOM Hospitality serves hotel organizations by providing users with a communication platform for engaging with them and other external users. It serves external users (customers) by offering a streamlined information system for booking and tracking accommodation. A customer interface might include functions such as customer support, offers, local offers, record keeping and connections to other guests.

Insurance Industry

Figure 29:
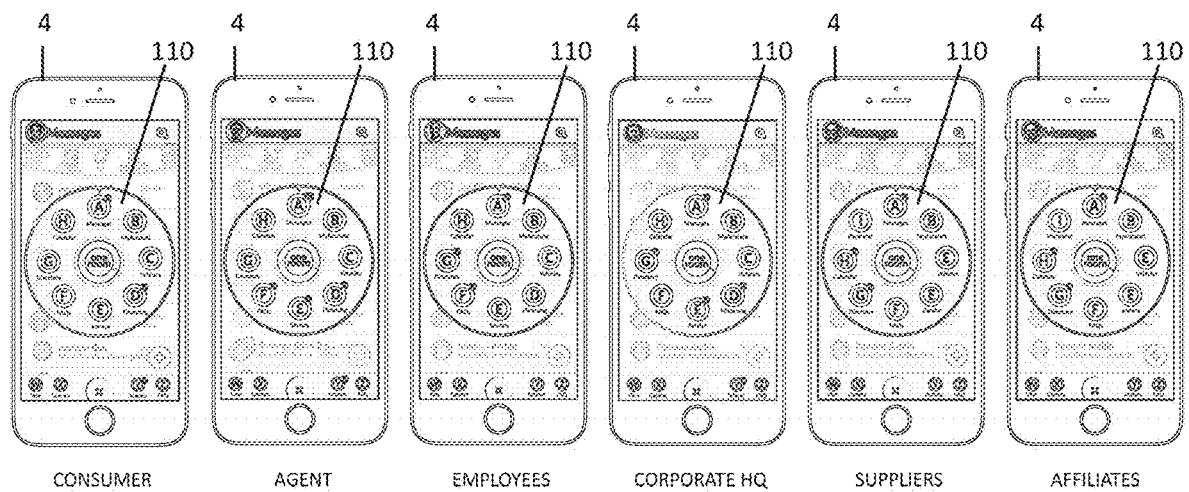
FIG. 29 is a depiction of a series of six reduced mobile communications devices each of which show an actions dialer feature of the graphical user interface for various insurance industry user groups.

Referencing FIG. 29, the reader will there consider a series of six client devices 4 outfitted with the software application supporting the present platform, each of which devices are depicted with a graphical user interface highlighting the Action Dialer 110 feature or tool according to the present invention. The ONEROOM platform provides a one-stop communication system for companies involved in the provision of insurance by providing users with a single source interface for all communication, record keeping and data transmission functions between all relevant parties, including but not limited to customers, agents, support staff, underwriters and any other relevant participants necessary for the successful provision of insurance. User groups include insurance customers, agents, organizational staff, organizational leaders and secondary service providers. An insurance customer interface might have functions relating to each type of insurance they have purchased (e.g. life, car, house, etc.) enabling users to keep track of all insurances and claims in one place.

Healthcare Sector

Figure 30:
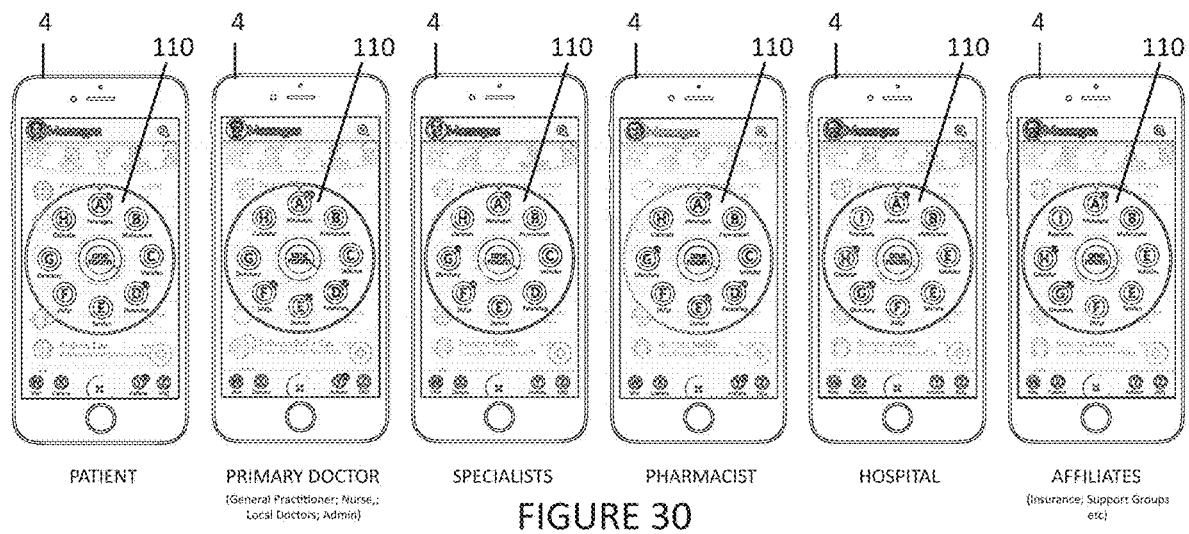
FIG. 30 is a depiction of a series of six reduced mobile communications devices each of which show an actions dialer feature of the graphical user interface for various healthcare or medical sector user groups.

Referencing FIG. 30, the reader will there consider a series of six client devices 4 outfitted with the software application supporting the present platform, each of which devices are depicted with a graphical user interface highlighting the Action Dialer 110 feature or tool according to the present invention. The present invention provides a single source interface for all communication, record keeping and data transmission functions necessary for seamless communication between various user groups involved in the receipt and provision of health care and medical care services through medical facilities.

User groups include but are not limited to doctors, hospitals, patients, insurance providers, consultants and service providers (including national health care providers). The present invention can also apply to medical care of animals and the provision of veterinary services. The present invention provides users with up-to-date information, health alerts and the ability to communicate quickly and easily with other user groups/healthcare providers.

The present invention provides a single source interface for all of the communication, record keeping and data transmission functions between all relevant parties, including but not limited to doctors, hospitals, patients, insurance providers, contractors, service providers and any other relevant participants necessary for the successful operation of a medical facility/health practice. The present invention provides a decentralized information structure that enables the highest level of security and data privacy centered around the integrity of user information, interactions and privacy.

The present invention provides a real-time connection between all parties that ensures transparency by making all communications and transactions traceable and verifiable to a user with the appropriate level of authorization and permission. The present invention enables patients to view, own and transfer their medical history, data and information in a mobile-first format to enable ease of ownership and movement of medical records.

Non-Governmental Organizations & Civic Groups

Figure 31:
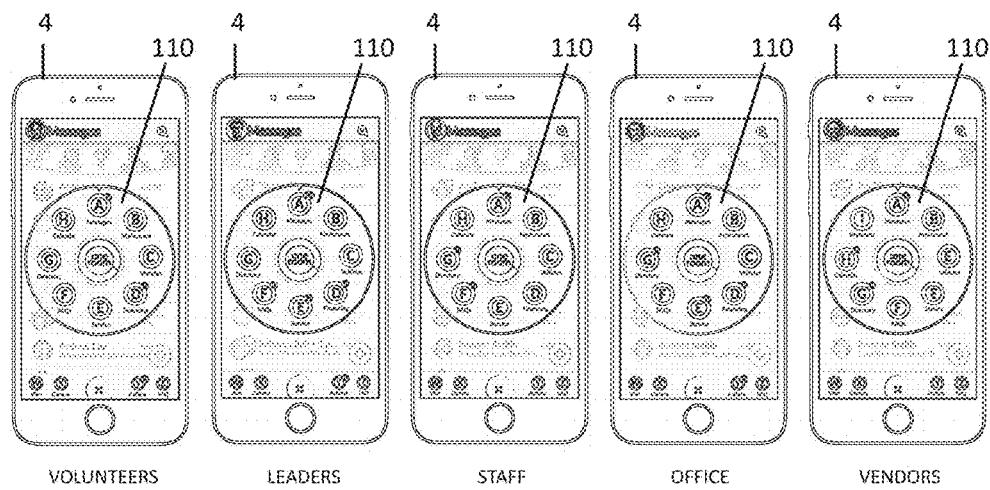
FIG. 31 is a depiction of a series of five reduced mobile communications devices each of which show an actions dialer feature of the graphical user interface for non-government organization user groups as exemplified by clubs, and civic groups, and relief organizations.

Referencing FIG. 31, the reader will there consider a series of five client devices 4 outfitted with the software application supporting the present platform, each of which devices are depicted with a graphical user interface highlighting the Action Dialer 110 feature or tool according to the present invention. The present invention provides a comprehensive communication system for all parties that are a part of or in any way connected to a local club, homeowners association, missions/relief organization or type of civic/religious or charitable organization. The ONERoom platform provides a real-time connection between all relevant parties and enables organizations to engage with volunteers, donors and external members of the community.

The present invention provides a single source interface for all communication, record keeping and data transmission functions necessary for the organization's successful operation. The present invention provides a real-time connection between all relevant parties, including but not limited to support staff, club leaders and the community at large, including any contractors and service providers. The present invention ensures transparency by making all communications and transactions traceable and verifiable to a user with the appropriate level of authorization and permission. The present invention enables validation of the proximity of users for management information (e.g. attendance) and acts as the equivalent of a digital swipe card to access to secured facilities and services.

Engineering Industries

Figure 32:
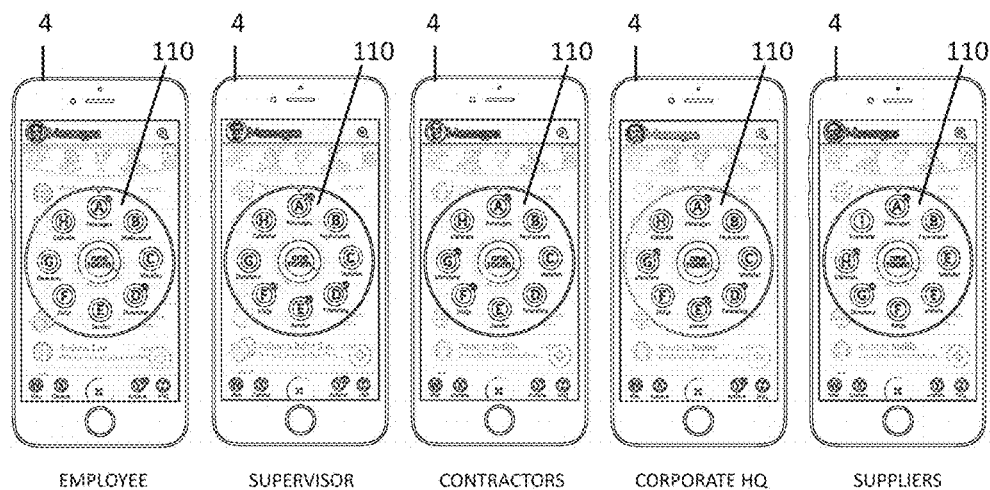
FIG. 32 is a depiction of a series of five reduced mobile communications devices each of which show an actions dialer feature of the graphical user interface for various engineering sectors and user groups.

Referencing FIG. 32, the reader will there consider a series of five client devices 4 outfitted with the software application supporting the present platform, each of which devices are depicted with a graphical user interface highlighting the Action Dialer 110 feature or tool according to the present invention. The present invention provides a one-stop communication system for energy companies (oil/gas/renewable) and the construction industry by providing a mobile communication platform that meets the needs of each user group and provides a comprehensive communication system to help get everyone on the same page.

User groups identified include organizational headquarters, local/remote project teams, contractors, subcontractors and clients. The present invention provides a single source interface for all of the communication, record keeping and data transmission functions between all relevant parties involved in the successful provision of services. The present invention provides a real-time connection between these parties that ensures transparency by making all communications and transactions traceable and verifiable to a user with the appropriate level of authorization and permission.

Property Management Sector

Figure 33:
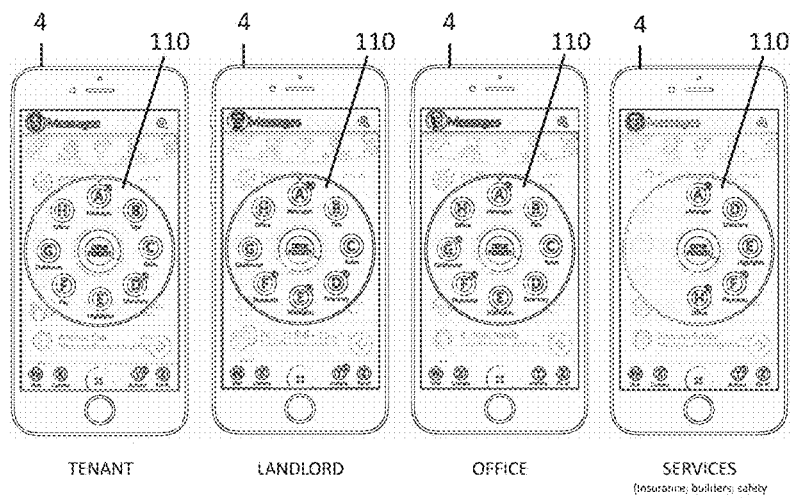
FIG. 33 is a depiction of a series of four reduced mobile communications devices each of which show an actions dialer feature of the graphical user interface for property management industry user groups.

Referencing FIG. 33, the reader will there consider a series of four client devices 4 outfitted with the software application supporting the present platform, each of which devices are depicted with a graphical user interface highlighting the Action Dialer 110 feature or tool according to the present invention. The present invention provides a comprehensive communication system for the parties involved in the leasing and managing of property and/or its services including but not limited to, tenants, landlords, organization and service providers (e.g. plumber). The ONERoom platform enables easy access to and dissemination of information and includes features such as payment, helpline and the ability to quickly and easily request repair services.

Sample use cases include providing (a) the ability of tenant to directly pay landlord or property management company; (b) the ability of landlord to provide informational material (e.g. handbook); (c) the landlord with the ability to directly communicate with and book a service provider; (d) service providers with the ability to keep track of work and receive payment for services rendered; (e) tenants, landlords and property management companies with the ability to share and hold contracts; and (f) tenants with the ability to quickly and easily notify landlord/property management company of outstanding repairs or queries in a mobile/text friendly communication method.

Real Estate Sector

Figure 34:
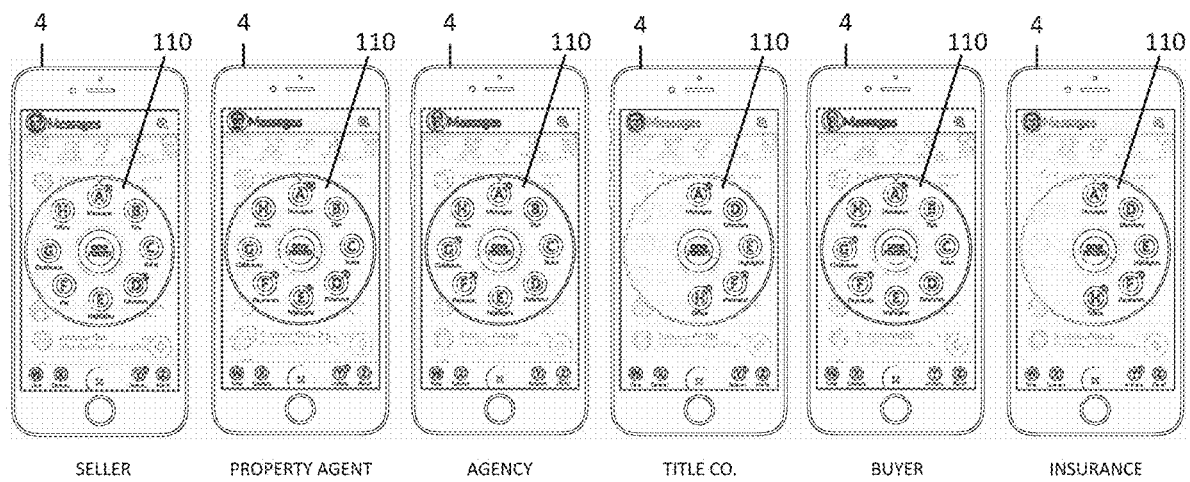
FIG. 34 is a depiction of a series of six reduced mobile communications devices each of which show an actions dialer feature of the graphical user interface for various real estate sector user groups.

Referencing FIG. 34, the reader will there consider a series of six client devices 4 outfitted with the software application supporting the present platform, each of which devices are depicted with a graphical user interface highlighting the Action Dialer 110 feature or tool according to the present invention. The present invention provides a comprehensive communication system for the parties involved in the administration of a real estate company including but not limited to the real estate business itself, individuals that purchase the goods or use the services of the business, or third parties that provide services to the real estate business.

The present invention provides (a) a single source interface for all of the communication, record keeping (contracts and title deeds) and data transmission functions necessary for the successful operation of a real estate business operation with an engaged consumer base; (b) a real-time connection between these parties; and (c) transparency, by making all communications and transactions traceable and verifiable to a user with the appropriate level of authorization and permission.

Retail Entertainment Industry

Figure 35:
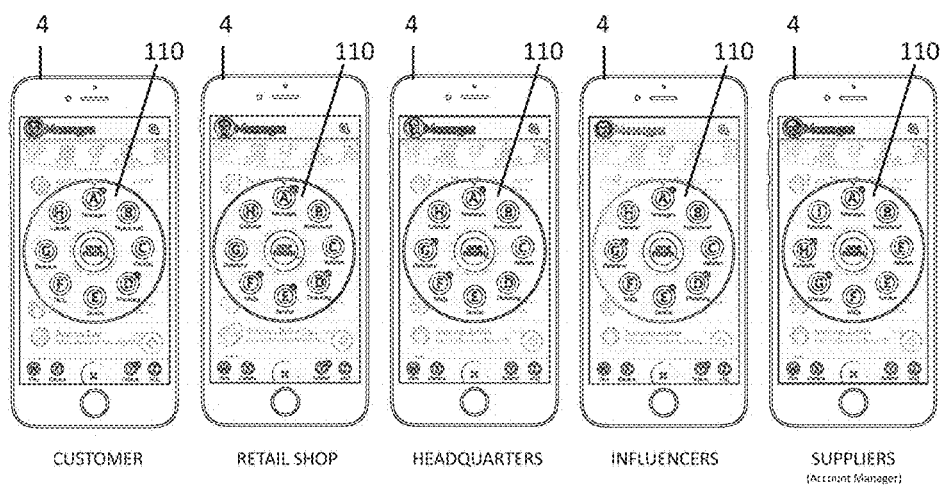
FIG. 35 is a depiction of a series of five reduced mobile communications devices each of which show an actions dialer feature of the graphical user interface for retail and entertainment industry user groups.

Referencing FIG. 35, the reader will there consider a series of five client devices 4 outfitted with the software application supporting the present platform, each of which devices are depicted with a graphical user interface highlighting the Action Dialer 110 feature or tool according to the present invention. The ONEROOM retail entertainment platform enables the user (especially the customer) to create their own personalized shopping/dining out experience with the ability to access all of their favorite retailers and services in one place and to connect with them on their own terms.

ONEROOM Retail provides retailers with greater direct marketing and personalized shopping experiences in order to increase sales. The inclusion of voice search and machine learning adds further benefits to both retailers and customers alike. The ONEROOM communication platform provides a circular engagement platform for ease of communication and transactions between customers, retailers and influencers. It also gives retailers an internal communication platform for liaising with retail floor staff, managers and corporate headquarters.

The present invention provides (a) a single source interface for all of the communication, record keeping and data transmission functions necessary for the successful operation of a company involved in the retail industry with an engaged consumer base; (b) a real-time connection between the customer/retailer with the ability to purchase goods; (c) users with the ability to build relationships with preferred retailers/vendors, to determine and manage the terms of contact (customers are enabled to allow retailers into their 'retail room' or 'look books' and where product/desire fit can be created through search and machine learning technology); and (d) validation of the proximity of users via beacons for management information (e.g. foot traffic).

Senior Care Sector

Figure 36:
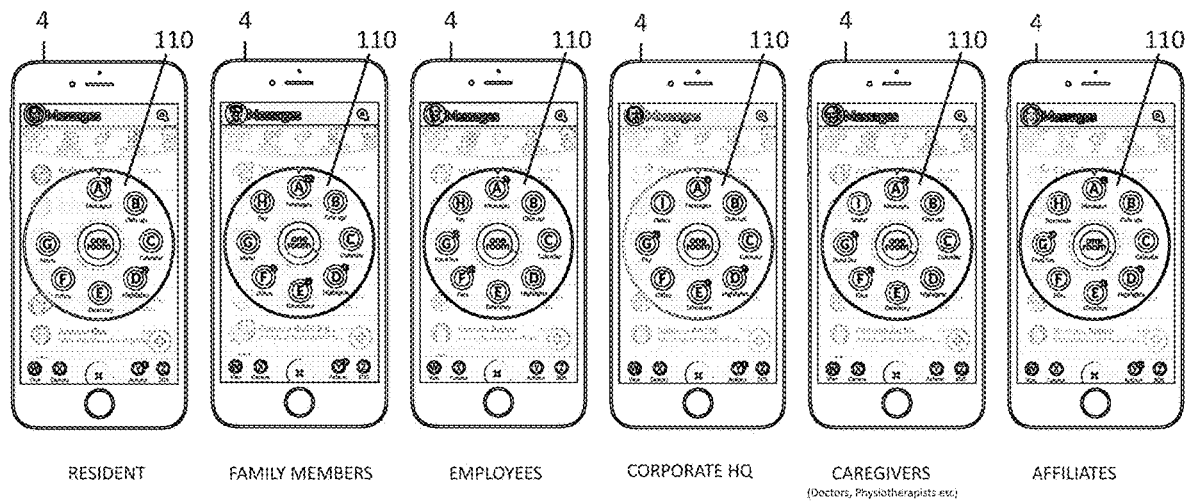
FIG. 36 is a depiction of a series of six reduced mobile communications devices each of which show an actions dialer feature of the graphical user interface for various senior care sector user groups.

Referencing FIG. 36, the reader will there consider a series of six client devices 4 outfitted with the software application supporting the present platform, each of which devices are depicted with a graphical user interface highlighting the Action Dialer 110 feature or tool according to the present invention. While adoption rates among seniors continue to trail those of the overall population, the share of adults ages 65 and up who own smartphones has risen 24 percentage points (from 18% to 42%) since 2013 according to a 2017 Pew Research Report. As more tasks migrate online, there are unique barriers and challenges hinder some older users from full engaging with technology. The present invention provides a simple but complete solution for organizations involved in the provision of senior services but also for senior users by providing them with a comprehensive communication system to help keep them engaged and independent.

For organizations involved in the provision of independent or assisted care provision, the ONEROOM platform allows for seamless communication between the senior living organization, the resident, their extended family, caregivers (e.g. doctors/physiotherapist), care home staff and external affiliates. It provides a single source interface for streamlined communication, record keeping and data transmission functions between support staff/caregivers, contractors, external service providers (medical/health professionals/pharmacy), residents and family members connected to the resident and any other relevant participants necessary for the successful provision of senior care. For senior users, it provides a user-friendly interface that gives them control and provides them with a simple process for communication, accessing information and giving them a tool for easy task execution by bringing external services onto a singular platform.

Small & Medium Sized Enterprises (SME)

Figure 37:
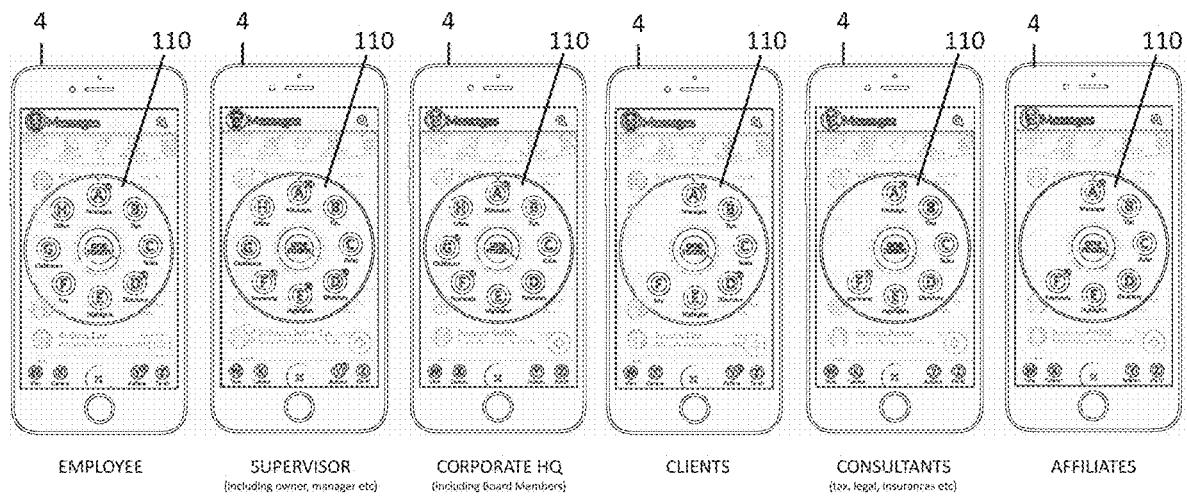
FIG. 37 is a depiction of a series of six reduced mobile communications devices each of which show an actions dialer feature of the graphical user interface for various small and medium enterprise businesses and user groups.

Referencing FIG. 37, the reader will there consider a series of six client devices 4 outfitted with the software application supporting the present platform, each of which devices are depicted with a graphical user interface highlighting the Action Dialer 110 feature or tool according to the present invention. ONEROOM Business provides small and medium sized enterprises (SME) with a comprehensive communication platform for engaging customers, staff and external partners and suppliers. The present invention provides a single source interface for all of the communication, record keeping and data transmission functions necessary for the successful operation of a small business operation seeking an engaged consumer base and providing a real-time connection between these parties in a secure, verifiable system.

For instance, a digital agency could use the ONEROOM platform to communicate with their employees, senior leaders/company owners, external clients, network of consultants and suppliers, and even end-users. End-users or business customers could use the platform to permit the organization to be added to their general ONEROOM retail platform. The present invention provides (a) a single source interface for all of the communication, record keeping and data transmission functions necessary for the successful operation of a small business operation with an engaged consumer base; (b) a real-time connection between these parties; (c) transparency, by making all communications and transactions traceable and verifiable to a user with the appropriate level of authorization and permission; and (d) validation of the proximity of users for management information (e.g. attendance) and acts as the equivalent of a digital swipe card to access to secured facilities and services.

Social Care Sector

Figure 38:
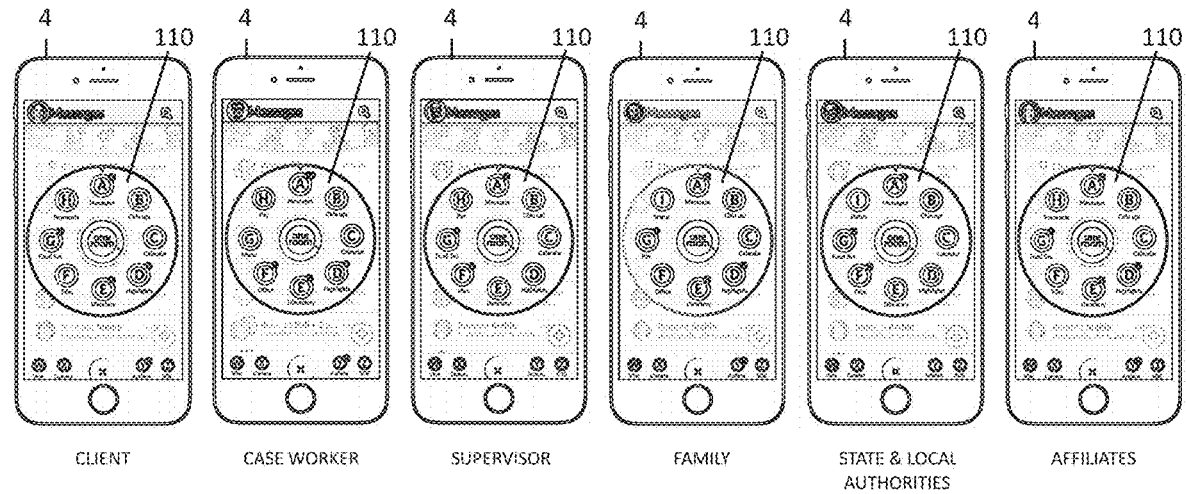
FIG. 38 is a depiction of a series of six reduced mobile communications devices each of which show an actions dialer feature of the graphical user interface for various social services sector user groups.

Referencing FIG. 38, the reader will there consider a series of six client devices 4 outfitted with the software application supporting the present platform, each of which devices are depicted with a graphical user interface highlighting the Action Dialer 110 feature or tool according to the present invention. The present invention provides a comprehensive communication system for the parties involved in the provision of social services. The present invention delivers a single source, user centric platform for communication, record keeping and data transmission functions necessary for the successful operation and interaction between user groups.

The present invention allows social service providers to connect internal staff and clients as well as external affiliates involved in the well-being of the client (schools, teachers, counsellors, charitable organizations, etc.). The present invention provides a decentralized information structure that enables the highest level of security and data privacy centered around the integrity of user information, interactions and privacy. The present invention also enables smaller providers of social care (e.g. counsellors) to implement a communication system with their clients. For instance, a counsellor can use the platform to engage with their clients on a deeper level but without the exchange of user data and provide clients with an accessible way of communicating with their counsellor.

Clubs & Sports Teams

Figure 39:
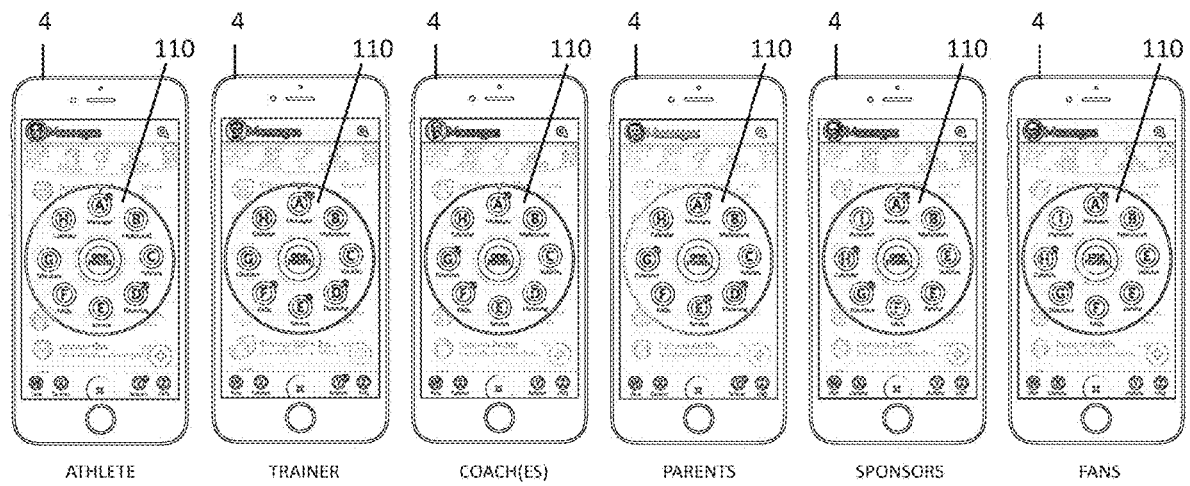
FIG. 39 is a depiction of a series of six reduced mobile communications devices each of which show an actions dialer feature of the graphical user interface for various clubs and sports teams and user groups.

Referencing FIG. 39, the reader will there consider a series of six client devices 4 outfitted with the software application supporting the present platform, each of which devices are depicted with a graphical user interface highlighting the Action Dialer 110 feature or tool according to the present invention. The effective management of sports teams and clubs requires streamlined communication and the ability to advise of schedule changes and reminders. The present invention provides a comprehensive communication system for each user group involved voluntary activity. Coaches and club leaders are able to easily administer teams and events. Team members and parents/guardians are able to communicate directly and can easily access relevant information in a secure and decentralized platform. The ONEROOM platform provides a real-time connection between all relevant parties including but not limited to the athletes, coaches and owners involved in the business of running a sports team and/or sports league and individuals such as parents and fans who support the sports team or league.

Art, Music & Media Industry

Figure 40:
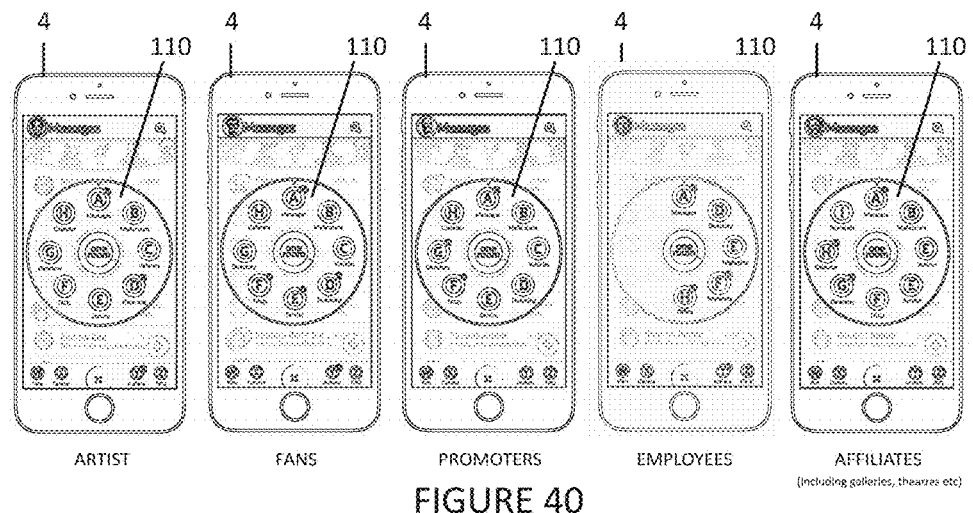
FIG. 40 is a depiction of a series of five reduced mobile communications devices each of which show an actions dialer feature of the graphical user interface for art, music and media industry and user groups.

Referencing FIG. 40, the reader will there consider a series of five client devices 4 outfitted with the software application supporting the present platform, each of which devices are depicted with a graphical user interface highlighting the Action Dialer 110 feature or tool according to the present invention. The present invention would help artists, musicians and other individuals in the media/entertainment industry by providing a streamlined platform to help them communicate with diverse user groups key to their artistic success.

The present invention (a) enables engagement between artists and fans by delivering a decentralized platform in which the user (artist) can be in control of release of content, monetization opportunities, business transactions and engagement with fans/followers; (b) provides a single source interface and platform for real-time communication and access to information and workflow processes relevant to the user groups; and (c) provides direct access to content in the form of audio, video, image or documents.

Utility Providers

Figure 41:
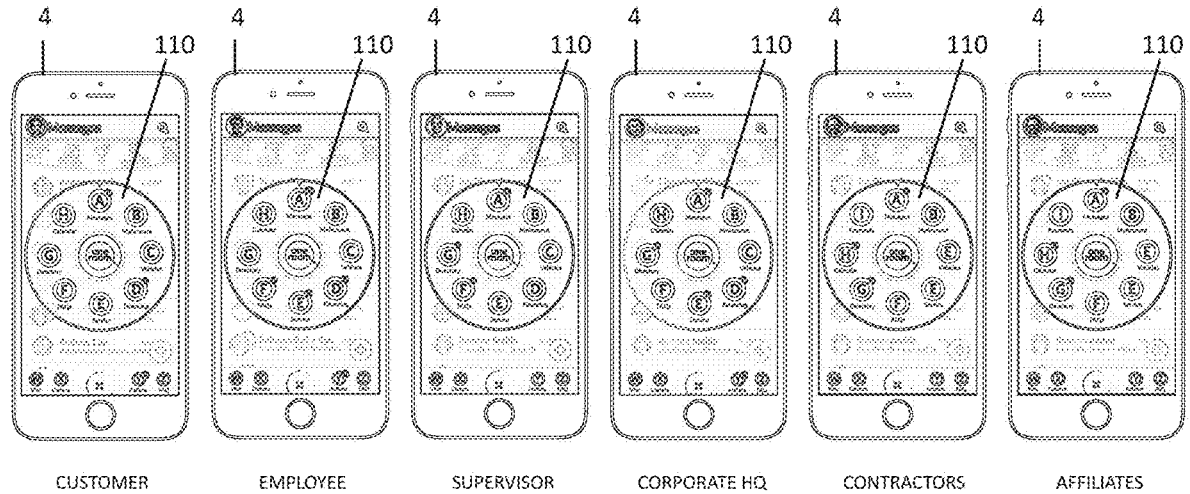
FIG. 41 is a depiction of a series of six reduced mobile communications devices each of which show an actions dialer feature of the graphical user interface for various utility sectors and user groups.

Referencing FIG. 41, the reader will there consider a series of six client devices 4 outfitted with the software application supporting the present platform, each of which devices are depicted with a graphical user interface highlighting the Action Dialer 110 feature or tool according to the present invention. The present invention lends itself to being an effective tool for users to track and interact with their utility providers.

It enables organizations to better engage consumers with information ranging from bills/payment to consumer tips and helps create a more personalized service for users. The present invention provides a comprehensive communication system for a company involved in the provision of utility services (including but not limited to—water, gas, electricity, telecoms, postal service, etc.). The present invention can enable the creation of a single sector hub whereby the end-user (consumer) can manage their utilities partnerships. The present invention can be used to replace the current mobile applications used by utility providers.

Financial Services Industry

Figure 42:
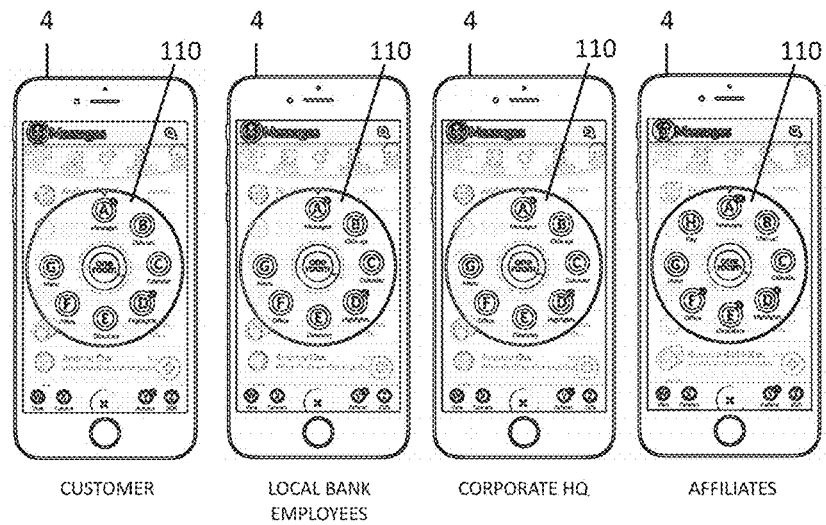
FIG. 42 is a depiction of a series of four reduced mobile communications devices each of which show an actions dialer feature of the graphical user interface for various financial services industry and user groups.

Referencing FIG. 42, the reader will there consider a series of three client devices 4 outfitted with the software application supporting the present platform, each of which devices are depicted with a graphical user interface highlighting the Action Dialer 110 feature or tool according to the present invention. The present invention can be used to replace the current mobile applications and interfaces used by banks and financial institutions. The present invention can also be used to enable financial advisory organizations to communicate effectively with its clients. The platform provides flexible system for providing a comprehensive communication platform for a company involved in the provision of banking and/or financial services (including but not limited to—personal and commercial banking).

The present invention provides users with a unique user identification (UUI) which enables the user to hold and self-authorize the transfer of their data or verification of their identity to other relevant parties (i.e. utility providers, insurance providers). The present invention provides a real-time connection between these banks and their customer(s) to ensure ability to execute relevant banking tasks and transactions and makes all communications and transactions traceable and verifiable to a user with the appropriate level of authorization and permission.

Individual User—Technology Providers

Figure 43A:
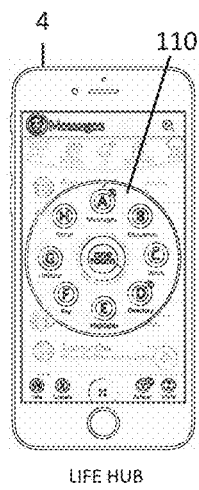
FIG. 43A is a depiction of a first reduced mobile communications device showing an actions dialer feature of the graphical user interface showing for a personalized 'one hub' interface for a technology or software application service provider or individual user.
Figure 43B:
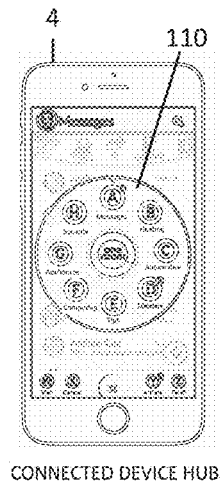
FIG. 43B is a depiction of a reduced mobile communications device showing an actions dialer feature of the graphical user interface showing a connected devices or Internet of Things (IoT) hub interface for technology or software application service providers.

Referencing FIGS. 43A and 43B respectively, the reader will there consider singular client devices 4 outfitted with the software application supporting the present platform, each of which devices are depicted with a graphical user interface highlighting the Action Dialer 110 feature or tool according to the present invention. The present invention can be used by individual users and/or technology providers ranging from telecom providers to technology companies to provide a streamlined communication system for companies involved in the provision and hosting of multiple functions on one singular device.

Reference here is made to the user-owned personal user hub as exemplified by the usage by Kathy as heretofore described who implements the ONEROOM platform on one singular client device 4. In this regard, it will be understood that the present invention can be used as a decentralized communication platform by individual users to build a personally owned communication platform that operates as a 'life hub' to manage the user's interactions with diverse organizations and users as generally embraced by the subject matter illustrated in FIG. 43A as usable by either individual users or individual technology service providers, as examples. FIG. 43A depicts an individual life hub.

FIG. 43B, by contrast depicts a hub for tech companies/operating systems. In this regard, the present invention provides (a) a single source interface and platform for all functions provided by a technology company particularly as it pertains to mobile devices (phones/tablets); (b) a single source interface for mobile applications that require effective communication between diverse user groups; and (c) a turn-key interface solution for connected device management. The present invention further helps IoT (Internet of Things) manufacturers to streamline the process and costs associated with creating and deploying comprehensive and cohesive device connectivity solutions, and provides service providers, with an easily networked end-to-end operational platform that delights users.

Graphical Interface Content Component List

The present invention is a flexible communication platform that enables the implementation of a wide-range of features that are implemented according to user and industry specific needs. The system has flexibility for allowing custom category and audience specific features according to organizational needs, industry and market forces. For instance, in an education context, components such as yearbook, grades or university information can be added; within healthcare, hospital information can be added with content such as menus/radio/maps). However, certain exemplary components are believed key or core to the ONEROOM platform as currently developed. The following listing is exemplary and not intended as an exhaustive listing. These are marked below under the heading 'Industry Agnostic Core Components'. Any assigned titles are subject to change. Additional features that can be added to the platform according to industry/user need are listed under 'Industry Components'.

Industry Agnostic Core Components

APPROVALS: A key component of the platform is the ability to easily and quickly execute and approve permissions. The pre-validated authentication process streamlines this process for the user and gives the organizational administrator an easy way of managing permissions.

ANALYTICS: Analytics allows user to see information such as usage statistics. The information will vary according to user group and industry requirements.

CALENDAR: The Calendar component gives users the ability to both create and add events to diary both within the platform and to sync/integrate with the users' main phone/computer calendar. This function incorporates the ability to create bespoke event invitations using selected templates to easily create invitations to work parties, birthday parties etc. This function also provides administrative oversight of responses and booking CAMERA: The Camera (prior art) allows users to take photos/videos that are stored to the ONEROOM cloud versus onto the device. This ensures that photos are not shared outside of the organization and gives organizations greater transparency and control of content. This function will look to incorporate machine learning to determine instances of use that fall beyond organizational codes of conduct (e.g. photos showing too much skin). This function enables the organization to monetize and control content via print.

DAILY SUMMARY: The Daily Summary is an aggregation of information of events and information including items such as outstanding tasks, encouragements, reminders, organizational news and incorporating functions enabled by current operating systems. This can take the format of an overlay mode or a 'ticker tape' style announcement stream. This function can incorporate the use of machine learning and artificial intelligence as well as voice activation and automatic speech recognition (with the ability to integrate with existing systems such as Alexa, Ski, Apple Homepod, Echo and similar systems in development).

DIRECTORY: The Directory is a core component of the ONEROOM platform. It enables users to communicate with other users on the platform according to authorizations and permissions granted by the organization/community. The Directory is an internal database of all users within the platform and allows users to search according to sub-groups, interests or other management levels in an organization.

HIGHLIGHTS: A visual photo and/or video stream highlighting current events or things happening within an organization. This is a centrally organized and administered social stream which other stakeholders are able to 'like' but not comment on. This function includes the ability to view according to group type and subject matter.

IDENTITY AUTHENTICATION: The central organization or administrator is responsible for how they verify the users/members/core constituents (e.g. driver's license, utility bill, passport). ONEROOM on-boarding occurs after the identity is verified by the organization with permission to revoke use privileges being retained by the organization of the user in event that they have lost their device or felt their access via two-factor authentication (e.g. PIN, biometrics) had been compromised.

INFORMATION CONTENT: Information content will vary according to organization. Types of information content that can be standalone feature components include lunch menus, office documents, contracts, maps, news, reports, information logs/tracking, files, prescriptions, handbooks, RFPs, file notes, customer service and support information and schedules. Information content includes audio, video and written content.

KNOWLEDGE BANK/TOOLKIT/DOCUMENTS: Allows users to access user-specific content created by their own or other user groups within the platform. The content within this component is dependent upon the organization and market sector and can range from video recordings, audio recordings, documents and hypertext links to resources outside of the ONEROOM platform.

MESSAGING: Allows users to communicate with other platform users according to set permissions determined by the central organization/leaders. This invention will enable 'in message' tagging to mark a message as having an action-related task. When marked, this action will be automatically added to the Action component to enable users to quickly and easily any outstanding tasks.

TASK LIST: Allows users to quickly comprehend any assigned tasks. This component aggregates data from messages, assignments and other task related workflow components. NOTES: Ability to add and tag profiles with notes; ability for users to view notes according to set permissions.

PAYMENT: This component enables users to make payments, receive payments (token or fiat), view transaction history or invoices, as required according to organizational needs. Payment processing via third-party providers (e.g. PayPal).

PERSONALIZED VOUCHERS: This component provides personalized vouchers according to user group, classification/subject category and personal preferences. This component allows users to store, access and redeem vouchers with retail partners and affiliate organizations and allows external affiliates to connect with users within a defined organization or community. For instance, a national footwear brand could offer a deep-cut discount to specific user groups within a fitness club using the ONEROOM platform.

PROFILE SETTINGS: This component enables users to manage data and preferences, allowing users greater control of their data and interface content. Settings can include setting permissions in relation to translation, audio to text/text to audio transcription, voice and speech activation.

SMILE: Daily encouragements with ability to segment according to type (e.g. words of wisdom, humor, etc.) and audience (e.g. teacher, pilot, accountant). This function incorporates the ability to tag as favorites, sort according to type using the upper dial interface.

SOCIAL, STREAMS: A visual and/or video stream within a specific user audience group that contains photos, videos and information of interest primarily to that user group (e.g. student vine can only be viewed by students, not teachers) with administrative oversight and transparency granted to the administrative keyholders. This function includes the ability to view according to group type (e.g. my friends, my sports clubs) and subject matter (e.g. lost and found, marketplace) via the upper dial interface.

SURVEYS: The ability to create or respond to surveys. This function includes the ability to assign surveys according to user type or subject matter. This function permits affiliated groups to send surveys/quizzes to groups within an organization. It allows for financial (paid surveys) to be conducted and enables for basic quiz functionality. This function includes elements such as viewing recent surveys (queued/completed), viewing account balance (for paid surveys) and creating surveys (a function dependent upon permission granted to user group).

THIRD-PARTY ACCESS AND APPLICATION: The platform streamlines content, tasks and communication addressing and personalizing content according to user group. Relevant third-party content can be accessed via the platform. This content can either be added by users to share with other permissioned user groups (for instance, a school could choose to allow teachers, students or parents to access a math application approved by the district or access to a third-party partner providing yearbook or student photography services). This content can also be added by ONEROOM according to user need and benefit (for instance, teachers could access directly access resource sharing applications provided by an external affiliate/ONEROOM partner).

INDUSTRY SPECIFIC COMPONENTS

CAREER DEVELOPMENT: A component that is customized according to organization and market sector. For instance, within education career development would be visible only on the teacher, administrator and district interfaces and would highlight professional development opportunities. It would not appear on the parent, student or external affiliate interfaces.

FUNDRAISING/CONTESTS/AUCTIONS: Ability for organizations or users (according to permissions) to create fundraising, contest and auction/bidding initiatives.

EMERGENCY VOICE/DATA/EVENT RECORDING: A component feature of the invention is the ability to record events which can be activated by users (according to organizational permission) in the event of minor/major incident. The component is designed to allow for differing levels of reporting and access according to user group permission and incident level. The initial level (L1) allows for emergency notification within the organization and directly with permissioned users. The secondary level (L2) allows for notification to permissioned user groups within the wider platform ecosystem. The third level (L3) allows for lockdown capability and notification to external affiliates (e.g. emergency services).

HELPLINES: Information content will vary according to organizations and their affiliations. Examples of user access to helplines range from cancer support, child/parent crisis line, financial support or access to government related support services.

JOB OPPORTUNITIES: A component that is customized according to organization and market sector. For instance, within a retail organization, this component would feature on the interface of the corporate HQ (allowing permitted user group to post opportunities) and on the retail shop (current staff) interface and on the customer and influencer interfaces, enabling brands to more easily draw new staff members from their consumer fanbase.

MARKETPLACE: The ability to locate, hire and commercially transact with other users around items being sold or searched for. This function can incorporate Artificial intelligence (AI) matching technology, social communication, chat tools, filters and specialized options such as 'like' options.

ONLINE LEARNING PORTAL: A customized component according to organization and user type. This feature allows organizations to manage and distribute relevant information and training materials to specific user groups. MOOC— mobile online courses/flipped classrooms.

PERFORMANCE REPORTS/GRADE CARDS: A customized component for educational institutions with data drawn from existing databases and information systems implemented by the organization. For smaller educational institutions, this component enables organizations to track grades within the platform.

TRANSPORT: A component that is customized according to organization and market sector. This component enables organizations to provider user groups with the transport information according to their needs and organization provision. For instance, in an educational context, the component would enable parents to view the school bus timetable/ route, request schedule changes or communicate with the bus driver about an issue or for a teacher to book a school minibus for a club excursion. At a corporate context, it would allow users to access information about company shuttles. It also enables users to directly access the services of affiliate partners (e.g. taxi providers).

TOKEN ECONOMY/LOYALTY POINTS: A customized component according to the need and desire of an organization to implement a loyalty/points or token system. This can be structured in accordance with FIG. 5 or can be designed according to the specific organizational/community needs.

What is claimed is:

1. A mobile-first computer-implementable communication platform for enabling secure data transfer of complex multiparty data, the mobile-first computer-implementable communication platform being operable in combination with multiple information systems, and comprising:
   a singular mobile-first graphical user interface, the singular mobile-first graphical user interface being usable across all multi-party user roles and enabling customization based on user specific roles within a community network in accordance with user needs and preferences;
   a remote abstraction layer enabling inter-information system operations and the singular mobile-first graphical user interface for multi-party client-to-information system interactions;
   an administrative client associated with the multiple information systems for enabling to access the remote abstraction layer for enabling user creation, user identification, device-to-user mapping, and client authentication; and
   at least one client, the at least one client comprising an initial device authentication mechanism for identifying and approving data release from a select information system as selected from a group consisting of the multiple information systems and data transfer between the select information system and other information systems as selected from the multiple information systems, the initial device authentication mechanism being based on initial face-to-face identity verification and subsequent multi-factor authentication;
   the mobile-first computer-implementable communication platform being customizable and expandable to provide a multi-party, user-centric flexible multi-tenancy decentralized communication platform, the multi-party, user-centric flexible multi-tenancy decentralized communication platform being characterized by providing a cloud-based solution wherein client data is separately held by community users based on data ownership rules.

2. The mobile-first computer-implementable communication platform of claim 1 wherein a device authentication mechanism comprises a microchip system for authenticating user identity and enabling access to the mobile-first computer-implementable communication platform.

3. The mobile-first computer-implementable communication platform of claim 1 is operable as a decentralized personally-owned platform wherein a single user can enable other users thereby providing a single user platform or single user information hub personally owned by the single user thereby establishing a communication hub within a defined community as determined by the single user and an invited network as invited by the single user.

4. The mobile-first computer-implementable communication platform of claim 1 wherein the singular mobile-first graphical user interface for client-to-information system interactions comprises a series of primary control features, the primary control features comprising a task-oriented action dialer tool, the task-oriented action dialer tool comprising an annular two-dimensional formation, the annular two-dimensional formation comprising a central hub region and a series of function-initiating and task-oriented icons arranged around the central hub region in a pre-determined manner according to particular end-user group requirements, the task-oriented action dialer tool for enabling end users to create shortcuts to external applications or websites and add relevant application icons to the task-oriented action dialer tool.

5. The mobile-first computer-implementable communication platform of claim 4 wherein the annular two-dimensional formation comprises an interior ring and an exterior ring concentrically positioned relative to the central hub region, the series of function-initiating and task-oriented icons being arranged about the central hub region intermediate the interior ring and the exterior ring.

6. The mobile-first computer-implementable communication platform of claim 5 wherein the task-oriented action dialer tool can be initiated from a reduced first interface position to an enlarged second interface operating position via an animation feature, the central hub region for initializing the task-oriented action dialer tool to the enlarged second interface operating position and for reducing the task-oriented action dialer tool to the reduced first interface position, the animation feature being characterized by a rising and lowering action of the task-oriented action dialer tool relative to the reduced first interface position such that the interior ring and the exterior ring reduce or enlarge in size during the rising and lowering action of the task-oriented action dialer tool via the animation feature.

7. The mobile-first computer-implementable communication platform of claim 5 wherein the task-oriented action dialer tool rotates about the central hub region with dialer tool rotation when a user touches and maintains contact in a circular clockwise or anti-clockwise motion therewith.

8. The mobile-first computer-implementable communication platform of claim 7 wherein each function-initiating icon rotates in an opposite direction to the dialer tool rotation such that an upright orientation of each function-initiating icon is maintained during the dialer tool rotation.

9. The mobile-first computer-implementable communication platform of claim 7 wherein the task-oriented action dialer tool rotates at a speed of the dialer tool rotation and continues the dialer tool rotation with dialer momentum when the user releases contact from the action dialer tool gradually slowing dialer tool rotational speed to an action dialer tool standstill.

10. The mobile-first computer-implementable communication platform of claim 7 wherein the dialer tool rotation is associated with audible tones, selected by the user or according to administrative permissions, the audible tones being perceptible when the series of function-initiating and task-oriented icons pass a 12 o'clock position.

11. The mobile-first computer-implementable communication platform of claim 7 wherein the task-oriented action dialer tool comprises an infinity line extending intermediate and connecting the interior ring and the exterior ring, the infinity line being a point on the task-oriented action dialer tool where the series of function-initiating and task-oriented icons disappear when entering a first side of the infinity line and the series of function-initiating and task-oriented icons appear when emerging from a second side of the infinity line.

12. The mobile-first computer-implementable communication platform of claim 11 whereby the infinity line enables additional function-initiating and task-oriented icons to be added to the task-oriented action dialer tool by users, the additional function-initiating and task-oriented icons being added to the task-oriented action dialer tool as emergent from the second side of the infinity line.

13. The mobile-first computer-implementable communication platform of claim 5 wherein the task-oriented action dialer tool partially obscures a background screen, the background screen displaying, with varying degrees of transparency intermediate the interior ring and the exterior ring as selected by a user, a select function, the select function being associated with a select function-initiating icon positioned at a 12 o'clock position on the task-oriented action dialer tool.

14. The mobile-first computer-implementable communication platform of claim 5 wherein the function-initiating and task-oriented icons are industry-specific, the industry-specific function-initiating and task-oriented icons being displayable upon the task-oriented action dialer tool for a series of specific sectors and specific user groups within the series of specific sectors, the industry-specific function-initiating and task-oriented icons being displayable upon the task-oriented action dialer tool for aggregating connections between the series of specific sectors thereby providing a life-affiliate hub whereby the industry-specific function-initiating and task-oriented icons represent the series of specific sectors.

15. The mobile-first computer-implementable communication platform of claim 5 wherein the task-oriented action dialer tool is color-coded for different sectors and categories of users.

16. The mobile-first computer-implementable communication platform of claim 4 wherein the primary control features comprise a drop-down tier filter, the drop-down tier filter comprising multiple drop-down sub-tiers, the multiple drop-down sub-tiers being numbered according to a complexity of a user group.

17. The mobile-first computer-implementable communication platform of claim 16 wherein the multiple drop-down sub-tiers are defined by concave borders relative to function-initiating icons displayed within each of the multiple drop-down sub-tiers, a user being able to adjust a select sub-tier by touching and maintaining contact therewith and moving the select sub-tier in an arcuate motion, the multiple drop-down sub-tiers thereby providing side-to-side rotation for function selection.

18. The mobile-first computer-implementable communication platform of claim 1 being customizable and expandable with each user group assigned a bespoke action dialer tool, the bespoke action dialer tool being assigned according to a series of unique functions aligned with (a) an organizational role and workflow of each user group, and (b) differing levels of data accessibility based on authorized permissions set by at least one organizational administrator, each user group therefore being able to access a unique, customized set of authorized information, data, record-keeping and messages.

19. The mobile-first computer-implementable communication platform of claim 1 comprising a voice-activated user interface gained through machine-learning enabling a user to access information directly from the mobile-first computer-implementable communication platform or via integration with other cloud-based voice-activated services and apparatus.

20. The mobile-first computer-implementable communication platform of claim 1 wherein the initial device-authentication mechanism transfers information and data via location-based proximity beacons and services for authenticating user activity and enabling access to internal and external affiliates and services, and groups of users based on organizational administrative authorization.

21. The mobile-first computer-implementable communication platform of claim 1 being operable as an emergency voice and data event recorder and transmitter for providing information and security to a host organization, permissioned user groups, and external affiliates.

* * * * *